US011486585B2

(12) United States Patent
Nyström et al.

(10) Patent No.: US 11,486,585 B2
(45) Date of Patent: Nov. 1, 2022

(54) PANEL AND A HEATING SYSTEM

(71) Applicant: Heat Click Company AB, Nyköping (SE)

(72) Inventors: Taisto Kalevi Nyström, Nyköping (SE); Håkan Johan Löfholm, Huddinge (SE)

(73) Assignee: Heat Click Company AB, Nyköping (SE)

( * ) Notice: Subject to any disclaimer, the term of this patent is extended or adjusted under 35 U.S.C. 154(b) by 480 days.

(21) Appl. No.: 16/615,461

(22) PCT Filed: May 18, 2018

(86) PCT No.: PCT/SE2018/050513
§ 371 (c)(1),
(2) Date: Nov. 21, 2019

(87) PCT Pub. No.: WO2018/217152
PCT Pub. Date: Nov. 29, 2018

(65) Prior Publication Data
US 2020/0103124 A1 Apr. 2, 2020

(30) Foreign Application Priority Data

May 22, 2017 (SE) .................................. 1750632-0

(51) Int. Cl.
*F24D 13/02* (2006.01)
*E04F 15/02* (2006.01)
(Continued)

(52) U.S. Cl.
CPC ...... *F24D 13/024* (2013.01); *E04F 15/02038* (2013.01); *E04F 15/107* (2013.01);
(Continued)

(58) Field of Classification Search
CPC .. F24D 13/02; F24D 13/024; E04F 15/02038; E04F 2290/023; E04F 15/107;
(Continued)

(56) References Cited

U.S. PATENT DOCUMENTS 5,004,895 A 4/1991 Nishino et al.
7,432,472 B2 * 10/2008 Åkerlind ................. E04F 15/02
219/541

(Continued)

FOREIGN PATENT DOCUMENTS

CN 1469958 A 1/2004
CN 103267315 A 8/2013
(Continued)

*Primary Examiner* — Andrew J Triggs
(74) *Attorney, Agent, or Firm* — Blank Rome LLP

(57) ABSTRACT

A panel comprising a heat providing layer is presented. The panel includes panel coupling means arranged for coupling the panel to adjacent panels. Longitudinal grooves are arranged in the panel along the whole length of the panel. In order to provide heat, at least one electrical end connector is arranged at one or more end panel coupling means. The electrical end connectors are arranged for being electrically connected to the heat providing layer, for being at least partly electrically conductive, and for at least partly protruding from the one or more end panel coupling means, thereby providing an electrical connection between the heat providing layer of the panel and a corresponding heat providing layer of at least one adjacent panel coupled to the panel. The invention also concerns a heating system comprising such a panel, the electrical end connector, and a method for installing such a heating system.

20 Claims, 14 Drawing Sheets

(51) Int. Cl.
*E04F 15/10* (2006.01)
*H05B 3/06* (2006.01)
*H05B 3/26* (2006.01)

(52) U.S. Cl.
CPC ........ *H05B 3/06* (2013.01); *E04F 2201/0176* (2013.01); *E04F 2290/023* (2013.01); *H05B 2203/016* (2013.01); *H05B 2203/026* (2013.01)

(58) Field of Classification Search
CPC ....... E04F 2201/0176; H05B 2203/026; H05B 2203/016
See application file for complete search history.

(56) References Cited

U.S. PATENT DOCUMENTS

| | | | | |
|---|---|---|---|---|
| 8,835,809 | B2* | 9/2014 | Dohring | F24D 13/024 219/213 |
| 9,353,533 | B2* | 5/2016 | Carrubba | E04F 13/0826 |
| 9,394,698 | B2* | 7/2016 | Carrubba | E04F 15/105 |
| 10,119,709 | B2* | 11/2018 | Döhring | H05B 3/20 |
| 10,760,283 | B2* | 9/2020 | Carrubba | E04F 15/02033 |
| 2006/0137280 | A1* | 6/2006 | Bartnes | E04F 15/04 52/582.2 |
| 2006/0289144 | A1 | 12/2006 | Akerlind | |
| 2008/0210679 | A1 | 9/2008 | Raidt et al. | |
| 2011/0272392 | A1 | 11/2011 | Dohring et al. | |
| 2012/0292306 | A1* | 11/2012 | Lai | F24D 13/024 219/520 |
| 2014/0001170 | A1* | 1/2014 | Son | E04F 15/082 219/209 |

FOREIGN PATENT DOCUMENTS

| | | |
|---|---|---|
| CN | 205918048 U | 2/2017 |
| EP | 1 884 716 A2 | 2/2008 |
| EP | 2 116 778 A1 | 11/2009 |
| FR | 2 698 432 A1 | 5/1994 |
| JP | 51115744 U | 9/1976 |
| JP | 2000-179877 A | 6/2000 |
| JP | 2006-145066 A | 6/2006 |
| JP | 2008-51470 A | 3/2008 |
| KR | 10-2015-0133464 A | 11/2015 |
| SE | 1400611 A1 | 7/2016 |
| WO | WO 2004/048854 A1 | 6/2004 |

\* cited by examiner

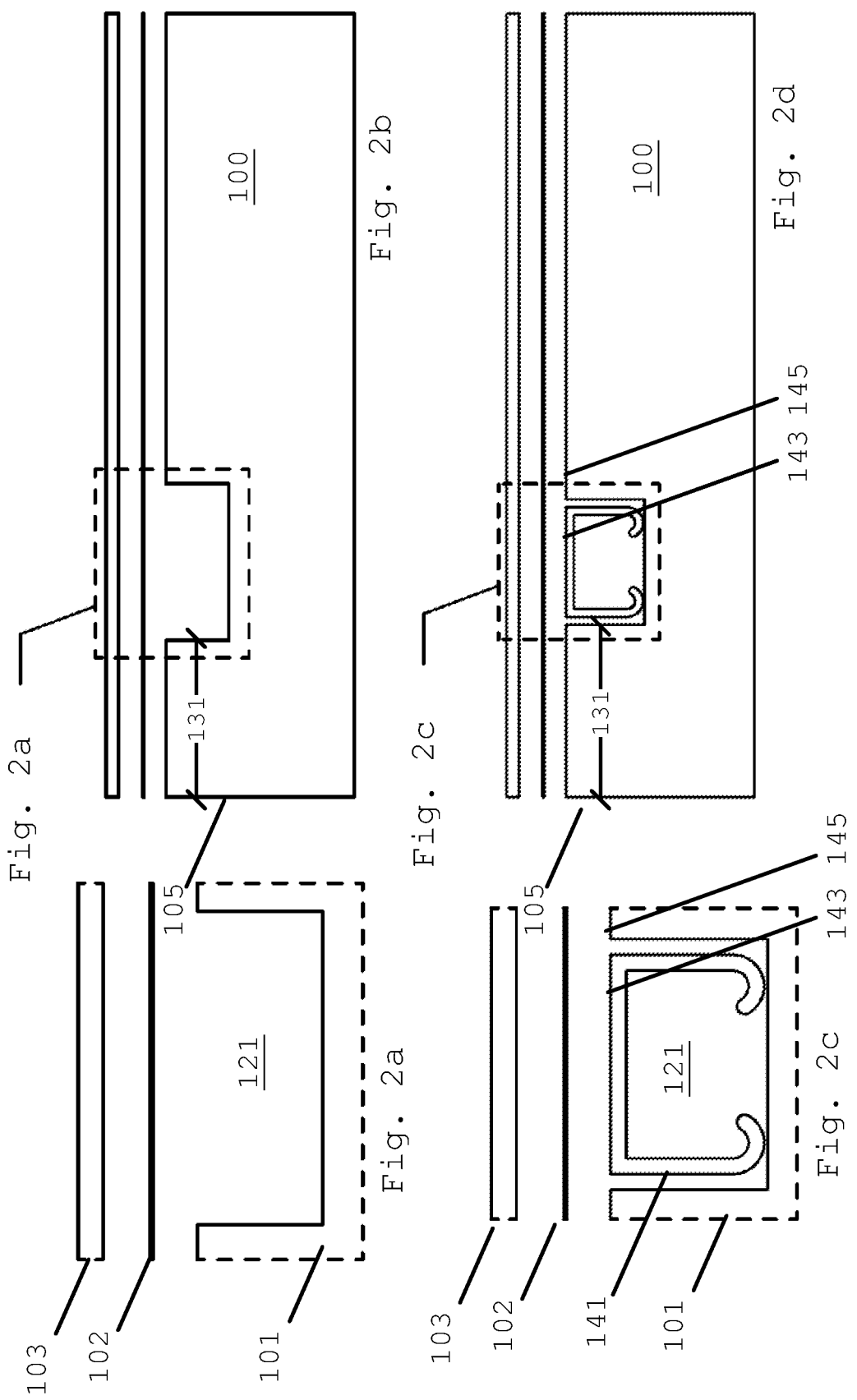

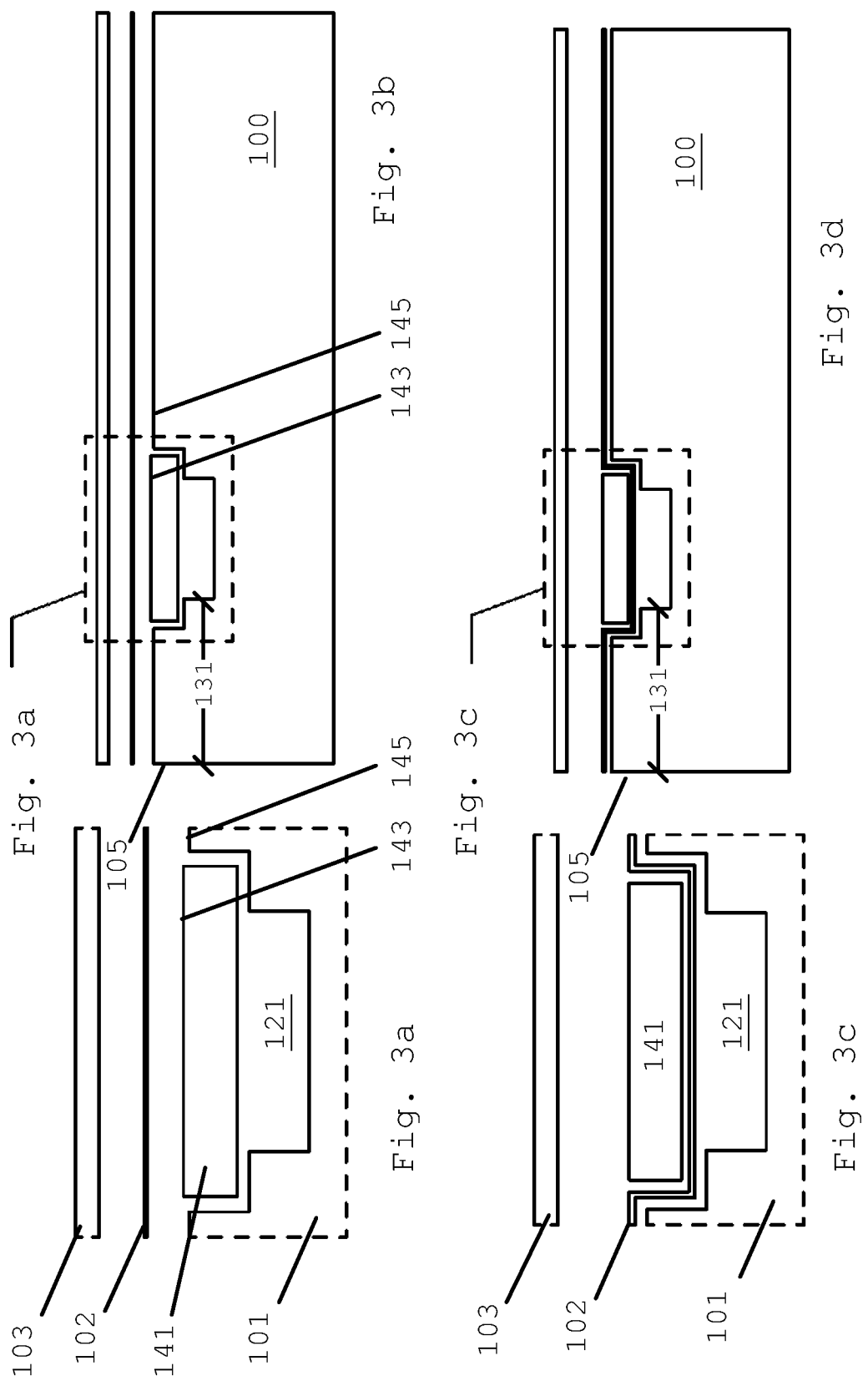

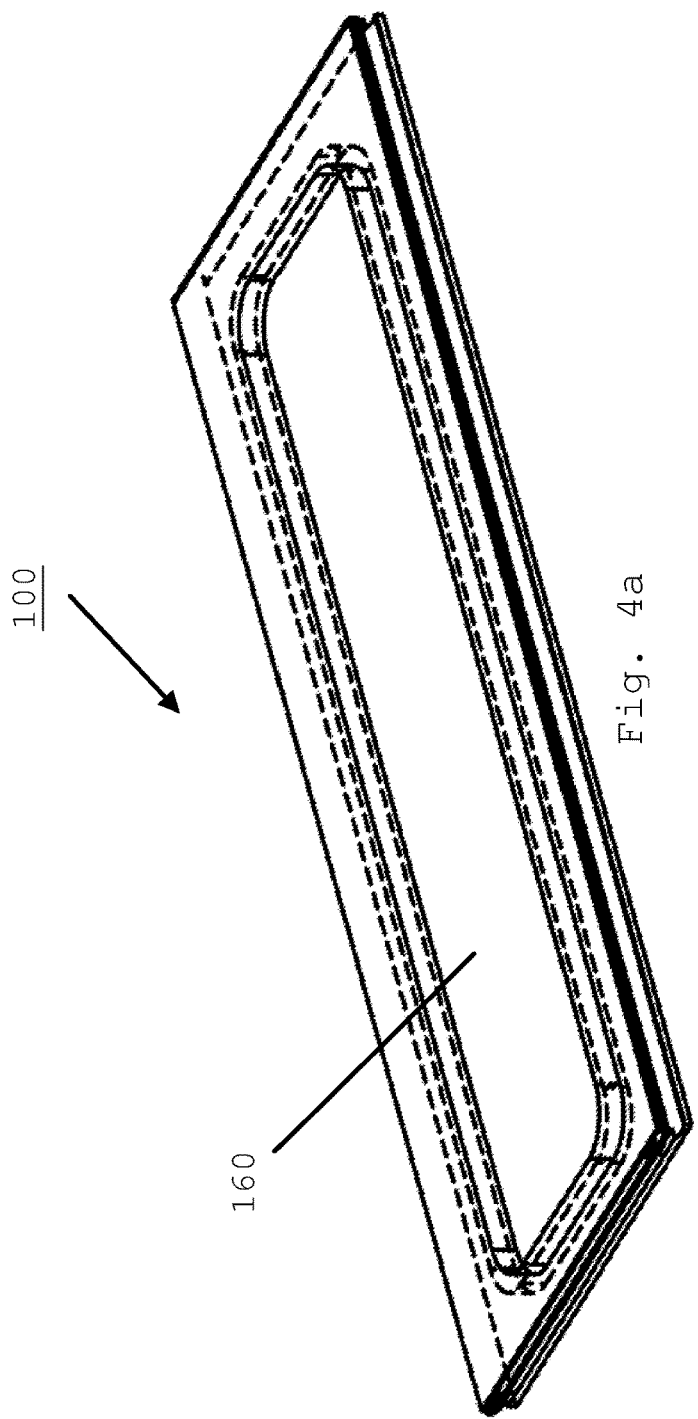
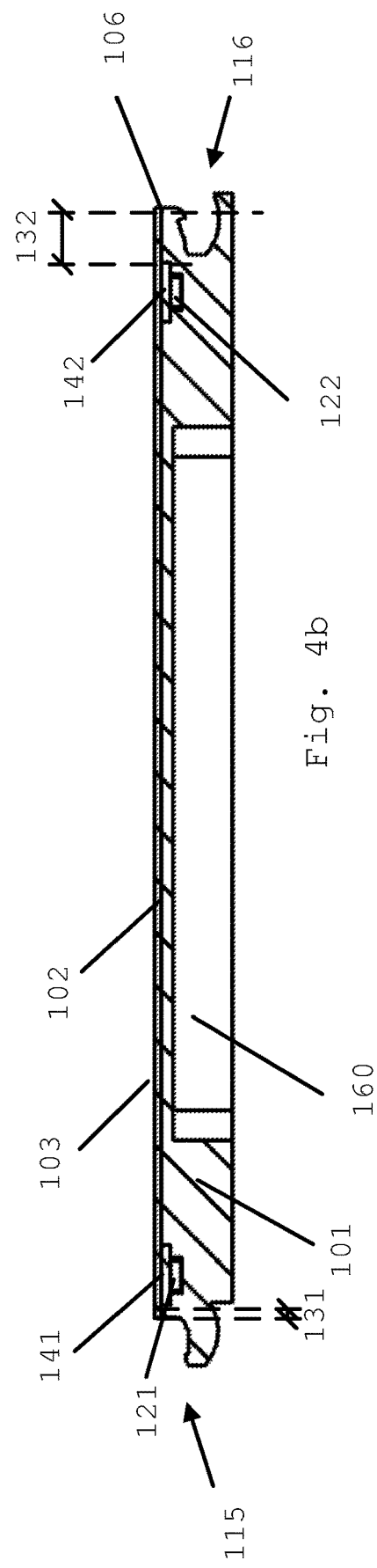

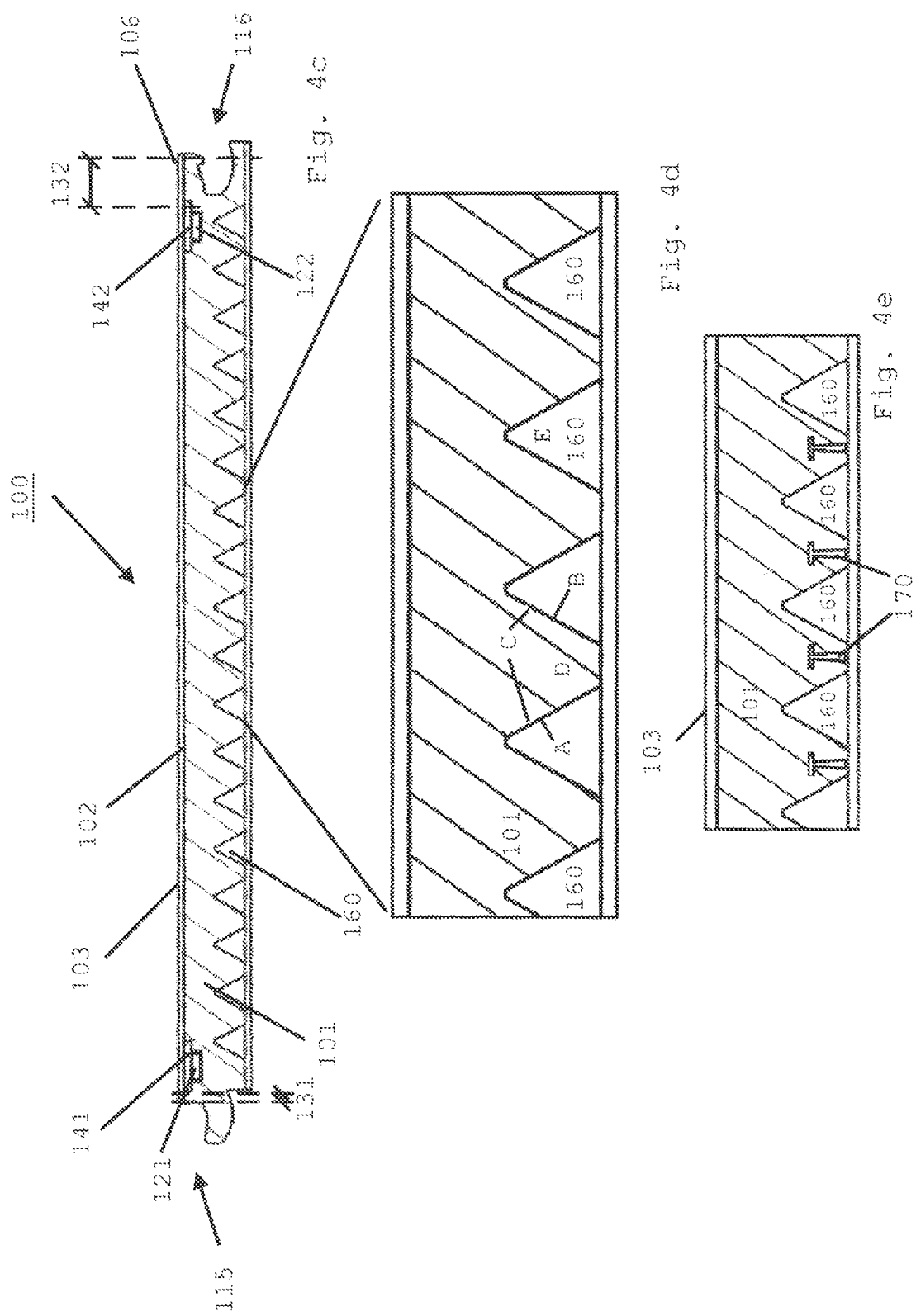

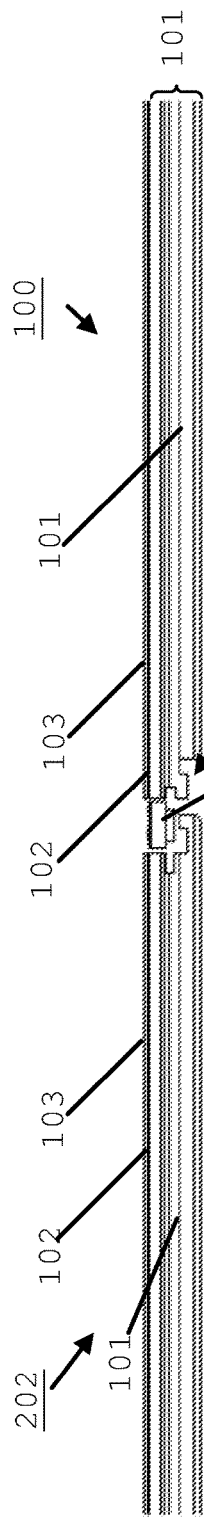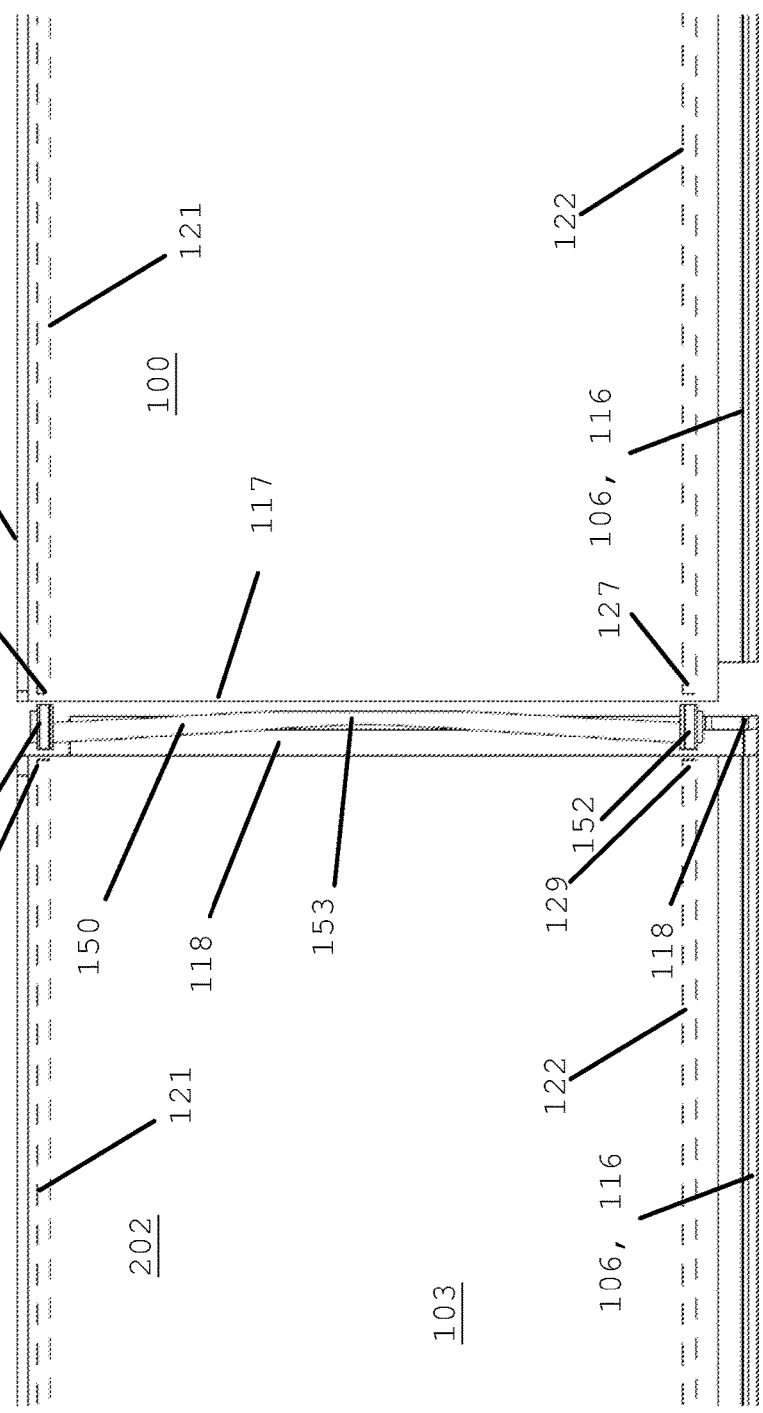
Fig. 5a
Fig. 5b

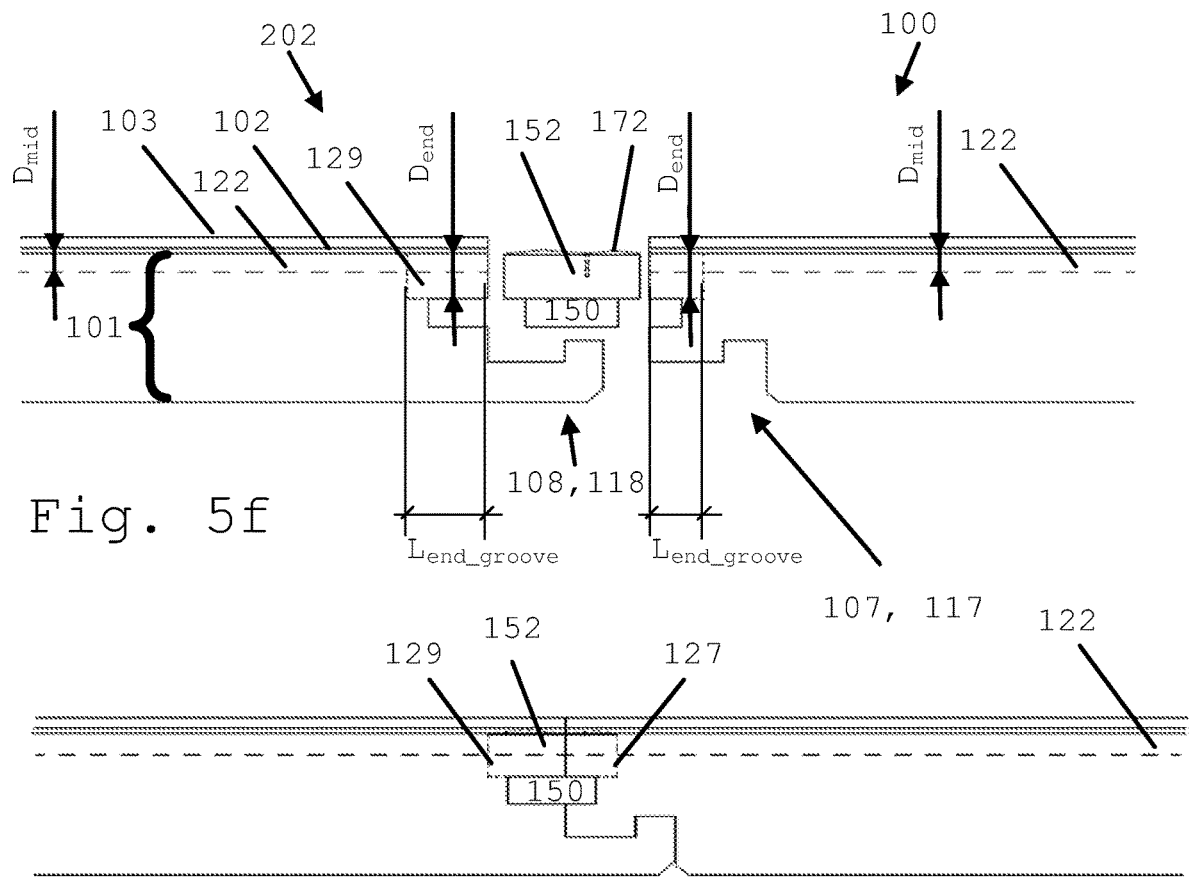
Fig. 5f
Fig. 5g
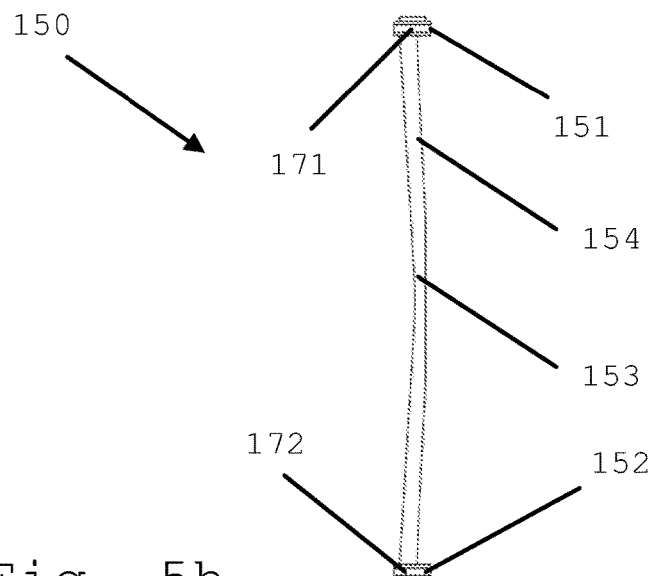
Fig. 5h

PANEL AND A HEATING SYSTEM

FIELD OF INVENTION

The present invention relates to a panel as defined in the preamble of claim 1. The present invention also relates to an electrical end connector as defined in the preamble of claim 31. The present invention also relates to a heating system as defined in the preamble of claim 32. The present invention also relates to a method for installing a heating system as defined in claim 36.

BACKGROUND OF INVENTION

The following background information is a description of the background of the present invention, which thus not necessarily has to be a description of prior art.

One of our times big challenges is to reduce the overall energy consumption in the world. In many parts of the world, houses, apartments, offices, shops, factories and/or other public or non-public spaces, need to be heated in order to provide an acceptable environment for people spending time in these spaces. Such heating thus needs to provide a comfortable temperature at the same time as the energy consumption should be kept at a minimum.

Underfloor heating may be used for reducing the energy consumption at the same time as an acceptable temperature/environment is provided. It is nowadays common to install underfloor heating using warm water or electricity as a heat source when stone and/or ceramic tiles are used for covering the floor. Also, underfloor heating may be used when wooden floors, such as e.g. parquet flooring, are used for covering the floors.

Traditionally, the heat used for providing the underfloor heating has been created by warm water flowing in pipes/tubes under the floor boards and/or by electricity flowing through resistance in sheet materials arranged under the floor boards. Such a known solution is described in US2008/0210679, in which a mat/sheet "denoted heating device 1" in the document is arranged under a "floor covering 12", i.e. under the actual floor boards. These pipes/tubes and/or sheet materials are thus arranged underneath the wooden floor, or underneath the stone and/or ceramic tiles. These traditional solutions have a disadvantage in that they are not very efficient in providing the heat into the space where it is actually needed, i.e. into the space above the wooden floor, and/or above the stone and/or ceramic tiles. This is due to the fact that the heat is created underneath the wooden floor, or underneath the stone and/or ceramic tiles, and thus needs to be transported through the entire wooden floor, and/or through the entire stone and/or ceramic tiles to reach the space where the e.g. people are to be present, i.e. to reach the space which should be heated. Also, a large part of the created heat is transported in the opposite direction, i.e. away from the wooden floor, or the stone and/or ceramic tiles, which also means away from the space which should be heated. Thus, a lot of the created heat is lost in such traditional heating systems, wherefore the heating system is inefficient and wastes energy.

In a prior art solution shown in US20060289144, a flooring board is instead provided with an embedded heating foil within the board, which is arranged for creating heat when being supplied with electrical energy. Hereby, the created heat is much more efficiently provided to the space in which it is needed, since the heat is created within the actual flooring board, instead of underneath it.

SUMMARY OF INVENTION

The flooring board shown in US20060289144 has, however, a number of problems related to the power supply to the flooring boards. The flooring board has electrical connecting means arranged on the grooves and tongues of the quick coupling joints being used for mechanically coupling the flooring board together with other flooring boards. Since the electrical connecting means are arranged on the grooves and tongues of the joint, the electrical connecting means will also experience small movements when pressure is applied on the flooring boards. The parts of the joints, i.e. the grooves and the tongues of the joints, move slightly every time for example a person walks on the flooring boards. Hereby, the electrical connecting means in US20060289144 will become worn out after some use. Also, even a lost contact may result from the wear of the electrical connecting means, whereby the heating function is lost. Also, a short circuit may be caused by the wear of the electrical connecting means, which may be hazardous due to e.g. a risk of fire. These possible problems are of course very unfortunate, especially for a floor having a long expected life time. Such a floor may have to be exchanged after a considerably shorter time than expected due to a malfunctioning heating function of the floor.

It is therefore an object of the present invention to provide a panel, a heating system, and a method that solve at least some of the above stated problems and/or disadvantages.

The object is achieved by the above mentioned panel according to the characterizing portion of claim 1.

The panel includes:
- a base layer;
- a heat providing layer attached to the base layer, the heat being created by electric energy;
- a covering layer attached to the heat providing layer;
- first and second opposite longitudinal sides including first and second longitudinal panel coupling means, respectively, arranged for coupling the panel to adjacent panels; and
- first and second opposite end sides including first and second end panel coupling means, respectively, arranged for coupling the panel to adjacent panels.

The panel further includes:
- at least first and second longitudinal grooves arranged in the base layer from the first end side to the second end side and facing the heat providing layer, the at least first and second longitudinal grooves being arranged in parallel with, and having at least first and second distances to the first and second longitudinal sides, respectively; and
- at least one electrical end connector arranged at one or more of the first and second end panel coupling means, the at least one electrical end connector including first and second end portions, the first and second end portions being at least partly electrically conductive and at least partly protruding from the one or more of the first and second end panel coupling means, thereby providing an electrical connection between the heat providing layer of the panel and a corresponding heat providing layer of at least one adjacent panel coupled to the panel.

According to and embodiment of the present invention, the first and second end portions of the at least one electrical end connector are arranged in the at least first and second longitudinal grooves, respectively.

According to and embodiment of the present invention, the at least one electrical end connector is at least partly resilient and includes an at least partly protruding portion between the first and second end portions, such that the at least partly protruding portion protrudes at least partly from the one or more of the first and second end panel coupling means in its relaxed state, when the first and second end portions of the at least one electrical end connector are arranged in the at least first and second longitudinal grooves, respectively.

According to and embodiment of the present invention, the panel further includes first and second panel end recesses adjacent to at least one of the first and the second end sides, respectively, the first and second panel end recesses having at least first and second distances to the first and second longitudinal sides, respectively, and being arranged for at least partly receiving the first and second end portions of the at least one electrical end connector.

According to and embodiment of the present invention, the at least one electrical end connector includes a supporting member attached to the first and second end portions, the supporting member protruding from the one or more of the first and second end panel coupling means and being arranged for being inserted into a supporting notch of an adjacent panel being coupled to the panel, thereby creating a force F acting against a torque Tq provided to the panel for achieving a mechanical coupling between the panel and the adjacent panel.

According to an embodiment of the present invention, the panel also includes at least first and second longitudinal coupling elements arranged in the at least first and second longitudinal grooves from the first end side to the second end side, respectively. Then, the first and second end portions of the electrical end connector are arranged for being electrically connected to the heat providing layer by means/use of the at least first and second longitudinal coupling elements.

The above mentioned object is also achieved by the above mentioned electrical end connector according to the characterizing portion of claim 31, the electrical end connector being insertable into one or more of the first and second end panel coupling means of a panel including:
a base layer;
a heat providing layer attached to the base layer, the heat being created by electric energy;
a covering layer attached to the heat providing layer;
first and second opposite longitudinal sides including first and second longitudinal panel coupling means, respectively, arranged for coupling the panel to adjacent panels; and
first and second opposite end sides including first and second end panel coupling means, respectively, arranged for coupling the panel to adjacent panels;
the electrical end connector including:
first and second end portions, the first and second end portions being at least partly electrically conductive and at least partly protruding from the one or more of the first and second end panel coupling means when being inserted therein, thereby providing an electrical connection between the heat providing layer of the panel and a corresponding heat providing layer of at least one adjacent panel coupled to the panel. According to an embodiment, the electrical end connector also provides a mechanical coupling to at least one adjacent panel.

When the panel and an adjacent panel are mechanically coupled together, the first and second end portions of the electrical end connector are, according to various embodiments, inserted/received in first and second groove end sections and/or panel end recesses of both the panel and the adjacent panel, whereby the at least partly conducting first and second end portions provides for the electrical connection between the heat providing layers of the panel and of the adjacent panel.

The above mentioned object is also achieved by the above mentioned heating system according to the characterizing portion of claim 32.

The heating system includes:
at least one panel as described in this document; and
an electrical energy providing arrangement, arranged adjacent to at least one of the first and the second end sides of the at least one panel for providing the electric energy to the at least one first and at least one second electrical end connectors.

The above-mentioned object is also achieved by the above mentioned method for installing the heating system according to the present invention, according to the characterizing portion of claim 36.

The method includes:
mounting the electrical energy providing arrangement;
mechanically coupling a first panel with at least one second panel by use of the coupling means on the first and second end sides, thereby creating a row of the first panel and the at least one second panel;
electrically connecting the first panel and the at least one second panel, e.g. by electrically connecting the heat providing layers of the first panel and of the at least one second panel, by use of the at least one end connector of the first panel; and
connecting first and second electrical power supply end connectors of one or more of the first panel and the at least one second panel to the electrical energy providing arrangement.

The panel and heating system according to the present invention provide for an energy efficient and durable heating of essentially all sorts of spaces.

By integrating the heat providing layer into a construction panel, such as e.g. a flooring panel, a wall panel and/or a ceiling panel, it is possible to efficiently, precisely and reliably regulate the indoor climate/temperature in spaces delimited by a floor, walls and a ceiling at least partly including such panels.

The heat providing layer is arranged very close to the space to be heated, since it is located directly under the covering/decorative layer. Hereby, the created heat may be very efficiently transported to the space to be heated when the panel according to the present invention is used. By this efficient heat transportation to the space to be heated, the consumption of electric energy being used for creating the heat is minimized.

The panel according to the present invention is cuttable in the sense of being possible to cut off and still be used for laying floors. This is due to the fact that the locations of the first and second longitudinal grooves are well defined, which also results in a well-defined placement of the first and second electrical end connectors and/or the first and second electrical power supply end connectors placed in the first and second grooves. Hereby, a cut off panel may be laid against another cut off panel, or may be laid against a whole panel, and would still be provided with a reliable supply of electrical energy for generating the heat in the panel, since the first and second electrical end connectors and/or the first and second electrical power supply end connectors of the panels will fit/match/meet such that a connection is made.

The electrical end connectors and/or the electrical power supply end connectors of the panel according to the present invention are at least partly separated from the mechanical panel joint coupling, i.e. from the joint coupling mechanically holding panels together. Hereby, the electrical end connectors and/or the electrical power supply end connectors are also protected from the many movements of the parts of the mechanical panel joint, and from the component wear these movement could result in.

By usage of the present invention, a secure and reliable power supply to the panel is assured. Also, the design of the electrical end connectors according to the present invention simplifies mechanical coupling of panels together, at the same time as a stable electrical coupling is provided.

Also, the end connectors of the panel according to the present invention provides for a reliable and secure electrical contact to corresponding end connectors of adjacent panels. Hereby, electrical energy to be used for creating the heat in the heat providing layer reliably reaches each one of coupled panels, and therefor also reaches the heat providing layers of each one of the panels.

The panel according to the present invention may be produced and installed cost efficiently. Since the heat may be created by use of low voltages, such as 4-60 Volts, e.g. approximately 25 Volts or approximately 50 Volts, the panels may even be installed by a layman, i.e. by a non-professional. Thus, by installation of the panels according to the present invention, there may not be a need for an electrician to be present, depending on laws and regulations where the panel is to be installed/used, which dramatically reduces the total cost for an end user, e.g. a house owner. Prior art electrical underfloor heating systems are often driven by much higher voltages, e.g. 230 Volts, which must be installed by a certified electrician.

Some known underfloor heating systems include a lower voltage mat/sheeting creating the heat, which is arranged under the wooden floor or underneath the stone and/or ceramic tiles. One such example is the above-mentioned heating device 1 in US2008/0210679, which is arranged under the floor covering 12. This arrangement results in considerable energy losses as described above. Also, this prior art lower voltage mat/sheeting is often difficult to properly install, wherefore a skilled person often must adapt e.g. the size of the mat/sheeting to fit the area to be covered by the floor. This increases the costs for installation of the floors.

The panel according to the present invention, however, already itself includes the heat providing layer, and does thus not need any heat creating mats to be installed underneath it.

As a non-limiting example, a power per floor area in an interval of approximately, 10-40 W/M$_2$, or 20-30 W/m$^2$ may be used for creating the heat. The used power per floor area may be seen as a balance between differing characteristics for the floor and/or heating. Higher power generally results in shorter heat providing circuits, which is an advantage when cutting off the panels since the part of the panel without heating due to the cutting off becomes small. However, for lower powers per floor area, the resistances of the heat providing circuits are less critical than for higher powers and lower resistances.

Detailed exemplary embodiments and advantages of the panel, the heating system, and the method according to the invention is hereafter described with reference to the appended drawings illustrating some preferred embodiments.

BRIEF DESCRIPTION OF THE DRAWINGS

Embodiments of the invention are described in more detail with reference to attached drawings illustrating examples of embodiments of the invention in which:

FIGS. 2a-d show schematic end views of sections of a panel according to some embodiments of the present invention, FIGS. 3a-d show schematic end views of sections of a panel according to some embodiments of the present invention, FIGS. 4a-e show schematic views of a panel according to some embodiments of the present invention, FIGS. 5a-k show schematic views of a panel and/or an electrical end connector according to some embodiments of the present invention.

DETAILED DESCRIPTION OF INVENTION

FIGS. 1, 2a-d, 3a-d, 4a-d, and 5a-k schematically show views of a panel 100 and/or an electrical end connector 150 according to various embodiments of the present invention.

Figure 1:
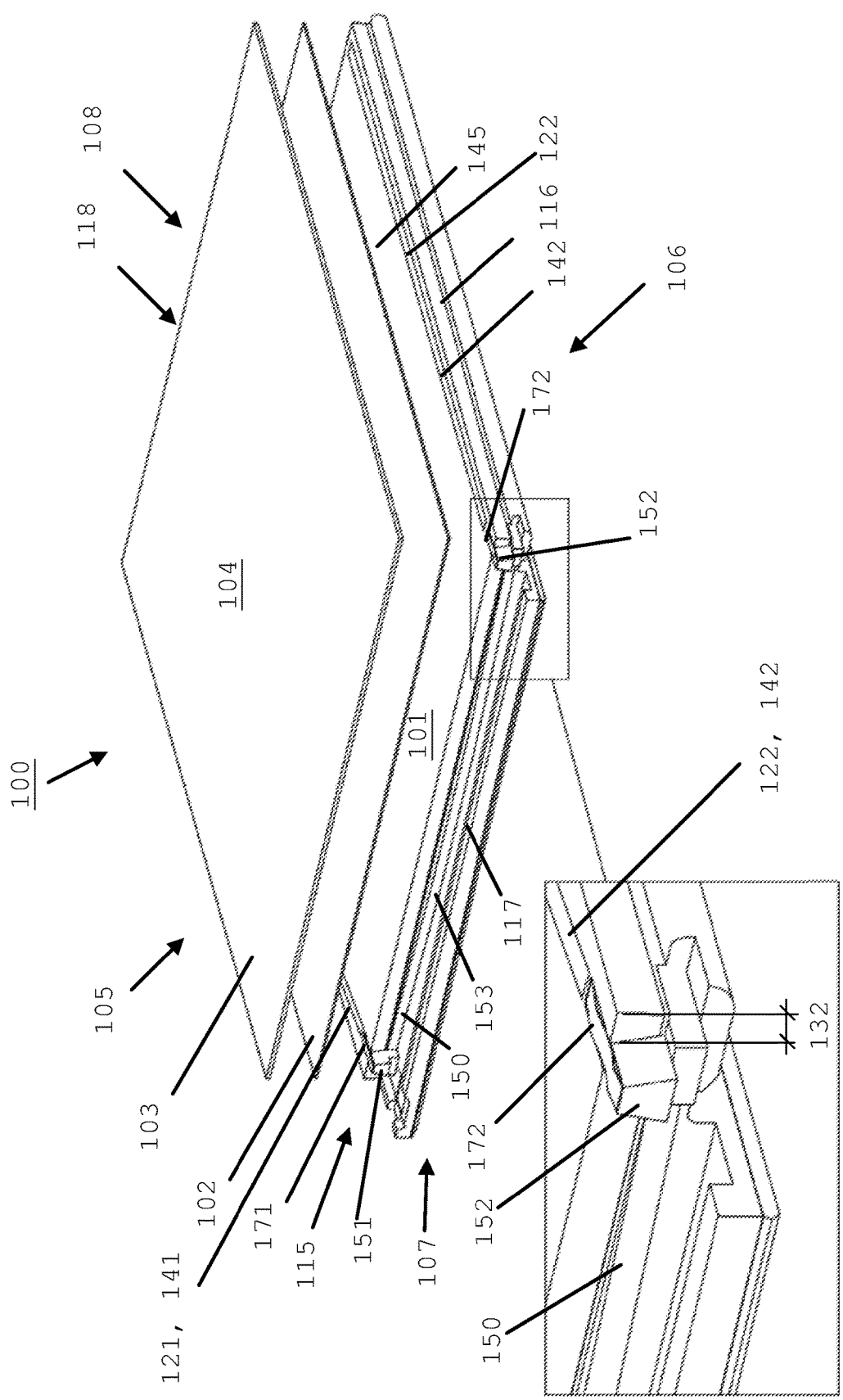
FIG. 1 shows a schematic end view of a panel according to some embodiments of the present invention.

As is shown e.g. in FIG. 1, the panel 100 is delimited by a first longitudinal side 105 and by a second longitudinal side 106 being opposite the first longitudinal side 105. The panel 100 is also delimited by a first end side 107 and by a second end side 108 being opposite the first end side 107.

Figure 6:
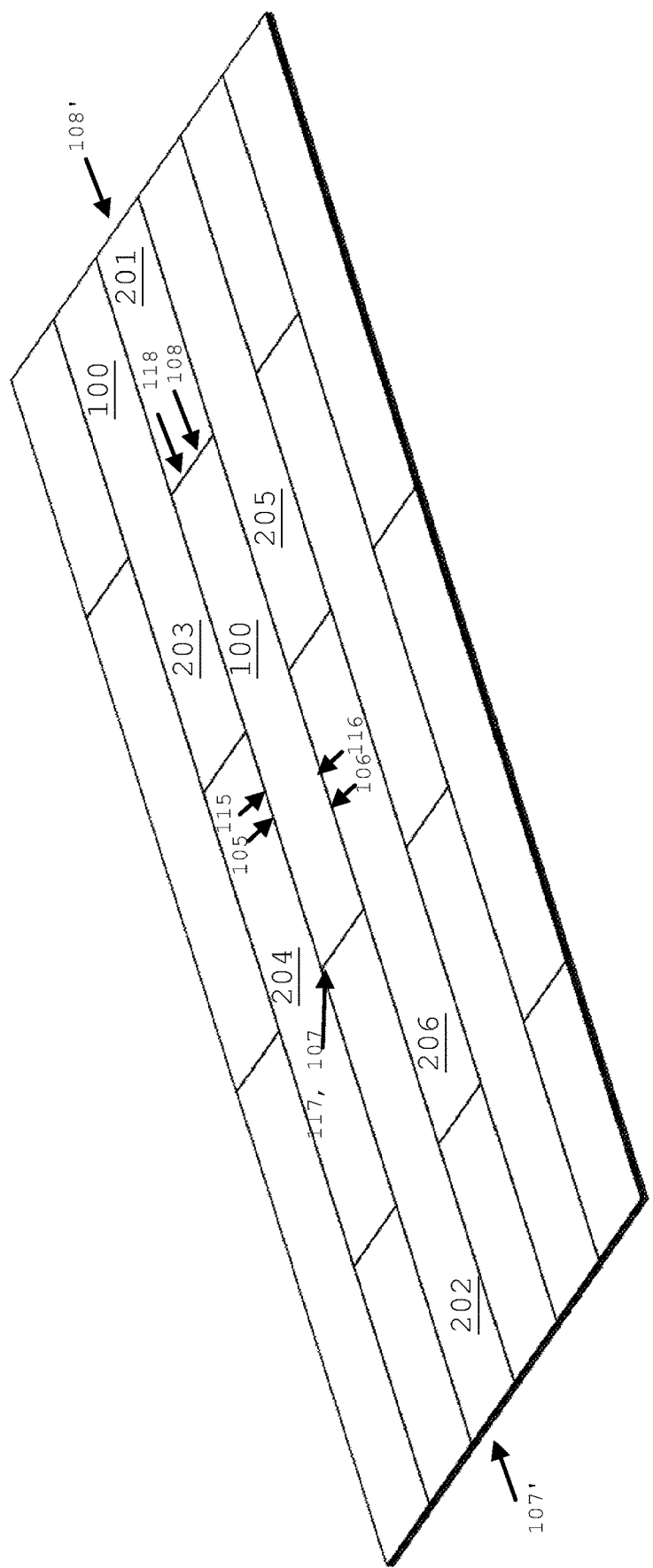
FIG. 6 shows a floor including multiple coupled panels according to some embodiments of the present invention, FIG. 7 schematically shows a heating system according to some embodiments of the present invention, FIG. 8 schematically shows a heating system according to some embodiments of the present invention, FIG. 9 schematically shows a complete a heating system according to some embodiments of the present invention, and FIG. 10 schematically shows a heating system.

The first longitudinal side 105, the second longitudinal side 106, the first end side 107, and the second end side 108 may be provided with panel coupling means, such as a groove/female and tongue/rabbet forming e.g. "click joints" 115, 116, 117, 118, respectively. The panel coupling means 115, 116, 117, 118 are, according to an embodiment, arranged in the base layer 101 at the first 105 and second 106 longitudinal sides of the panel, and at the first 107 and second 108 end sides of the panel, for mechanically coupling the panel 100 to at least one adjacent panel 201, 202, ... 206, i.e. to at least one other corresponding panel 201, 202, ..., 206 (as shown in FIG. 6), where the at least one other corresponding panel is provided with corresponding panel coupling means, in a known way.

The panel 100 further includes a base/core layer 101 and a covering/visual layer 103. The covering/visual layer 103 has a surface 104 possibly being visible from the space to be heated, i.e. from within the room in which the panel covers a floor, wall and/or ceiling. The covering/visual layer may have a suitable appearance/look, including colors and/or patterns.

The panel 100 further includes a heat providing layer 102 attached to the base layer 101, i.e. arranged between the base layer 102 and the covering/visual layer 103. This also means that the heat providing layer is arranged very close to the space to be heated, i.e. directly underneath the thin covering/visual layer 103. The heat providing layer 102 may include essentially any material being electrically conducting and having an electrical resistance suitable for creating heat, i.e. an increased temperature, when current flows through the material. The material may be formed as a heat generating element, which may have a large number of shapes. For example, the heat providing layer may comprise printed electronics, a film, one or more resistors, a sheet, a tape, a paint, or may have essentially any other shape or form suitable for creating heat through its electrical resistance and for being included in the panel according to the present invention. Thus, for example, the heat providing layer 102 may comprise at least one heat generating element including printed electronics having an electrical resistance, at least one film having an electrical resistance, and/or one or more resistors having an electrical resistance.

As a non-limiting example, it may be mentioned that, when the electric energy has a voltage of 25 V, i.e. when the electrical energy providing arrangement delivers a voltage of 25 V is used as power supply, 23 W/m$_2$ may be created by the heat providing layer according to an embodiment. The time constant for the temperature increase at the covering layer may be short, in the area of minutes, and a temperature increase of e.g. 3° C. may be quickly achieved.

The voltage drop increases with the squared length of the floor. For shorter floors, e.g. floors having a length shorter than 10 m, the voltage drop has little effect on the created heat. However, for longer floors, e.g. floor longer than 15 m, the voltage drop may noticeably affect the produced heat.

According to an embodiment of the present invention, the heat providing layer 102 is arranged at a heat depth $D_{heat}$ from the visible surface 104 in an interval of 0.1 mm-3 mm, 0.4 mm-1 mm, or 0.5 mm-0.8 mm, and/or at a depth of 0.6 mm. This then also means that the covering layer has a thickness $T_{cov}$ being equal to the heat depth $D_{heat}$; $T_{cov}=D_{heat}$; which results in an efficient transport of heat energy into the space to be heated, since the heat providing layer 102 is very close to the heated space.

According to an embodiment of the present invention, the layers of the panel 100, i.e. the base layer 101, the heat providing layer 102 and the covering layer 103 are attached/fixed to each other by use of an adhesive, such as e.g. a glue.

The panel according to the present invention includes a first longitudinal groove 121 arranged in parallel with, and having at least a first distance 131 to, the first longitudinal side 105, and a and second longitudinal groove 122 arranged in parallel with, and having at least a second distance 132 to, the second longitudinal side 106. The first 121 and second 122 longitudinal grooves are arranged in the base layer 101 of the panel, and extend from the first end side 107 to the second end side 108. The first 121 and second 122 longitudinal grooves face the heat providing layer 102, i.e. the opening/aperture of the groves are directed towards the heat providing layer 102.

The panel 100 according to the present invention further includes at least one electrical end connector 150 arranged at one or more of the first 117 coupling means at the first end side 107, and the second 118 end panel coupling means at the second end side 108, as illustrated e.g. in FIG. 1.

The at least one electrical end connector 150 includes first 151 and second 152 end portions that are at least partly electrically conductive, i.e. at least partly include an electrically conducting material, such as e.g. a suitable metal. The first 151 and second 152 end portions are also at least partly protruding from the one or more of the first 117 and second 118 end panel coupling means of the panel when being arranged at the one or more of the first 117 and second 118 end panel coupling means. This makes it possible for the first 151 and second 152 end portions to provide an electrical connection between the heat providing layer 102 of the panel 100 and a corresponding heat providing layer of at least one adjacent panel 201, 202 coupled to the panel 100. Thus, the first 151 and second 152 end portions are arranged for making the heat providing layers of at least two adjacent panels 201, 202 (shown e.g. in FIG. 6) electrically connectable to each other when the panels 100, 201, 202 are mechanically coupled to each other.

According to an embodiment of the present invention, schematically illustrated e.g. in FIGS. 1 and 5*a-h*, the first 151 and second 152 end portions of the at least one electrical end connector 150 are arranged in the at least first 121 and second 122 longitudinal grooves, respectively.

The at least one electrical end connector 150 may here be at least partly resilient and may also include an at least partly protruding portion 153 between the first 151 and second 152 end portions, as is illustrated in FIGS. 1, 5*b* and 5*h*. Hereby, the at least partly protruding portion 153 protrudes at least partly from the one or more of the first 117 and second 118 end panel coupling means in its relaxed state when the at least one electrical end connector 150 is arranged in the at least first 121 and second 122 longitudinal grooves.

As illustrated e.g. in FIG. 5*b* (being a top view of two panels 100, 202) and FIGS. 5*f-g* (being views of the second longitudinal sides 107 of two panels 100, 201), the at least first 121 and second 122 longitudinal grooves include, according to an embodiment, first 126 and second 127 groove end sections adjacent to at least one of the first 107 and the second 108 end sides, respectively. The first 126 and second 127 groove end sections are then arranged for at least partly receiving the first 151 and second 152 end portions of the at least one electrical end connector 150, respectively.

The first 126 and second 127 groove end sections may, as illustrated in FIG. 5*f*, have a depth $D_{end}$ being greater than a depth $D_{mid}$ along a rest of the at least first 121 and second 122 longitudinal grooves; $D_{end} > D_{mid}$. The end depth $D_{end}$ may here preferable essentially correspond to a thickness $T_{end\_con}$ of the first 151 and second 152 end portions of the at least one electrical end connector 150 being illustrated schematically in FIGS. 5*d-e*. Thus, $D_{end}=T_{end\_con}$. The first 121 and second 122 longitudinal grooves may have the middle depth $D_{mid}$ except from in the first 126 and second 127 groove end sections at the ends 123, adjacent to the end sides 107, 108, e.g. in the middle of the length of the first 121 and second 122 longitudinal grooves. When the end depth $D_{end}$ corresponds to the thickness $T_{con}$ of first 151 and second 152 end portions, there are no air gaps at the first 107 and second 108 end sides of the panel. Hereby, a very robust panel is provided. Often, the wear of e.g. flooring panels is worst close to the joints, at the first 107 and second 108 end sides and/or at the first 105 and second 106 longitudinal sides, which is mitigated by this embodiment providing robust panel ends.

Also, the first 126 and second 127 groove end sections may, according to an embodiment, have a length $L_{end\_groove}$ such that the first 151 and second 152 end portions of the at least one electrical end connector 150 protrudes from the one or more of the first 117 and second 118 end panel coupling means when being received in the first 126 and second 127 groove end sections, respectively. This is schematically illustrated e.g. in FIGS. 5*f-g*.

The first 151 and second 152 end portions of the at least one electrical end connector 150 are also received, respectively, in corresponding first 128 and second 129 groove end sections of an adjacent panel 201, 202, . . . , 206 being mechanically coupled to the panel 100 by one of the first 117 and second 118 end panel coupling means. This is schematically illustrated e.g. in FIGS. 5*f-g*.

The combined length $L_{end\_groove\_comb}$ of the first groove end sections 126 and 128 of the panel 100 and the adjacent panel 202 may, according to an embodiment essentially correspond to the length $L_{end\_con}$ of the first 151 end portion of the at least one electrical end connector 150. Correspondingly, the combined length $L_{end\_groove\_comb}$ of the second groove end sections 127 and 129 of the panel 100 and the adjacent panel 202 may, according to an embodiment essentially correspond to the length $L_{end\_con}$ of the second 152 end portion of the at least one electrical end connector 150. Hereby, the first 151 and second 152 end portions essentially exactly fit into the combined length $L_{end\_groove\_comb}$ of the groove end sections, whereby a stable and robust electrical connection is provided, as explained more in detail below.

According to an embodiment of the present invention, the lengths $L_{end\_groove}$ of the first groove end sections 126 and 128 of the panel 100 and the adjacent panel 202 are different/unequal. Correspondingly, the lengths $L_{end\_groove}$ of the second groove end sections 127 and 129 of the panel 100 and the adjacent panel 202, may be different/unequal, whereby the first 151 and second 152 end portions are arranged asymmetrically in the joint between the panel 100 and the adjacent panel 202, as is schematically illustrated e.g. in FIGS. 5*f-g*. The asymmetrical position of the first and second end portions in the joint may be utilized for increasing the stability when coupling panels together.

According to an embodiment of the present invention, the lengths $L_{end\_groove}$ of the first groove end sections 126 and 128 of the panel 100 and the adjacent panel 202, as well as of the second groove end sections 127 and 129 of the panel 100 and the adjacent panel 202, may be essentially equally long, whereby the first 151 and second 152 portions are arranged symmetrically in the joint between the panel 100 and the adjacent panel 202.

The at least one end connector 150, having the first 151 and second 152 end portions arranged for being inserted into the at least first 121 and second 122 longitudinal grooves, respectively, is illustrated e.g. in FIGS. 1 and 5*a-h*.

The at least one end connector 150 has the first 151 and second 152 end portions being connected/attached to each other by an at least partly resilient member 154, e.g. a spring member. The at least one end connector 150 may have an at least partly protruding portion 153, which may be formed by the resilient member 154 being slightly bent, e.g. by being curve-shaped, arch-shape, v-shaped and/or wave-shaped in its relaxed state. Actually, the at least partly protruding portion 153 may essentially have any shape which makes the end connector 150 protrude at least partly in its relaxed state from the one or more first 117 and second 118 end panel coupling means (and/or from their respective end sides 107, 108) where it is arranged. Hereby the at least partly protruding portion 153 of the at least one electrical end connector 150 is by its shape and/or its resilience arranged for being snapped into at least one of first 117 and second 118 corresponding end panel coupling means of at least one adjacent panel 201, 202. Hereby, the panel 100 is mechanically locked, by snap-fit locking the at least partly protruding portion 153 into one or more rims, apertures and/or notches of the corresponding end panel coupling 117, 118, to at least one adjacent panel 201, 202.

When the panels are installed, the end connector 150 is fixed, e.g. by being pre-fixed, to one panel 100 by insertion of the first 151 and second 152 end portions into the at least first 121 and second 122 longitudinal grooves, respectively. The at least partly protruding portion 153 then protrudes in its relaxed state from the end panel coupling means where it is fixed. When the panel 100 is then mechanically coupled to an adjacent panel 202, by first being tilted and then being pressed down towards the adjacent panel 202, the at least partly protruding portion 153 is initially pressed back into its own end panel coupling 117, 118 when the panel 100 is being pressed down to fit into the corresponding end panel coupling 117, 118 of the adjacent panel 202. However, when the end panel coupling 117, 118 of the panel 100 and the corresponding end panel coupling 117, 118 of the adjacent panel 202 have been fit together, the end connector 150 once again returns to its relaxed stat shape by snapping out into the one or more rims, apertures and/or notches of the corresponding end panel coupling 117, 118 of the adjacent panel 202, which helps the panel 100 and the adjacent panel 202 to be mechanically fixed to each other.

Also, when the panel 100 and the adjacent panel 202 are attached to each other in this way, the first 151 and second 152 end portions of the at least one electrical end connector 150 are initially inserted/received into the first 126 and second 127 groove end sections of the panel 100. Then, when the panel 100 is pressed down to be fitted into the corresponding end panel coupling 117, 118 of the adjacent panel 202, the first 151 and second 152 end portions of the at least one electrical end connector 150 are also inserted/received into the corresponding first 128 and second 129 groove end sections of the adjacent panel 202 being coupled to the panel 100.

As described more in detail below, the first 151 and second 152 end portions of the at least one electrical end connector 150 are at least partly electrically conductive, which facilitates an electrical connection between the panel 100 and the adjacent panel 202, i.e. between the heat providing layers of the panel 100 and the adjacent panel 202. The first 151 and second 152 end portions of the at least one electrical end connector 150 may for this reason include first 171 and second 172 electrically conducting tongues, respectively, as illustrated in e.g. FIGS. 1 and 5*c-f*. The tongues 171, 172 are arranged for being in electrical contact with the heat providing layers 102 of the panel 100 and of the adjacent panel 202 being coupled together.

Figure 5C:
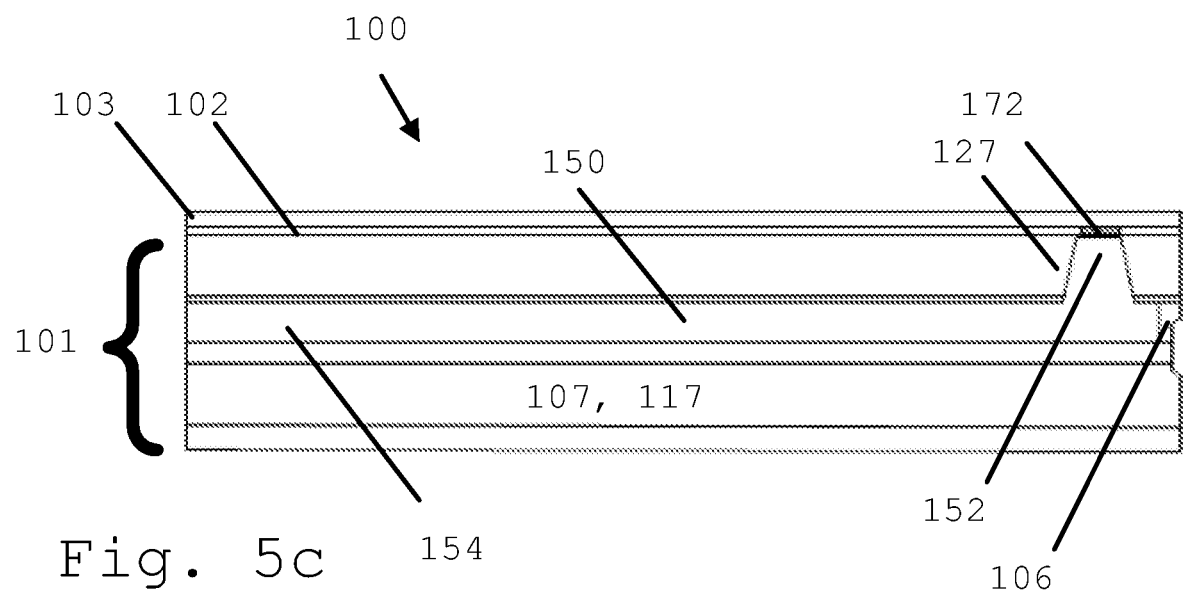

FIG. 5*c* shows an end side view of a part of the panel 100. The end panel coupling means 117 are arranged at the end side 107. It is here also illustrated how the second end portion 152 of the electrical end connector 150 is arranged/received/inserted in the second 127 groove end section of the second 122 longitudinal groove close to the second longitudinal side 106. Correspondingly (although not shown), the first end portion 151 of the electrical end connector is arranged/received/inserted in the first 126 groove end section of the first 121 longitudinal groove close to the first longitudinal side 105.

Figure 5D:
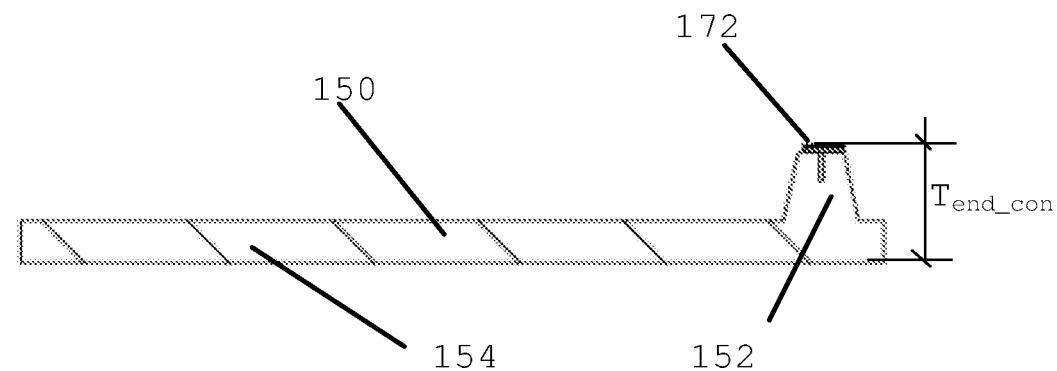
Figure 5E:
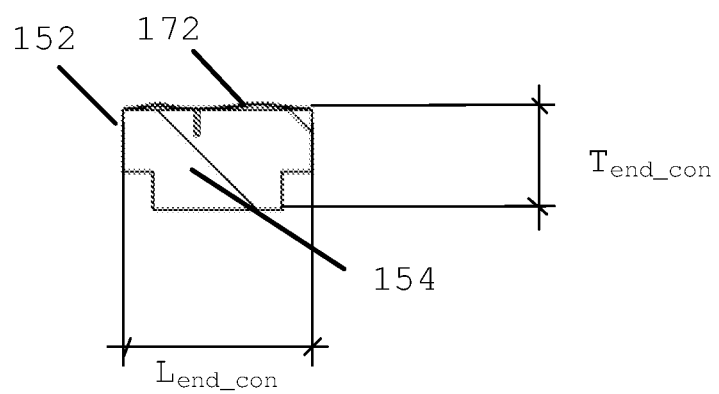

FIGS. 5*d-e* show two views of one part of the electrical end connector 150, including the second end portion 152, and the electrically connecting tongue 172 being attached to the end portion 152 e.g. by a nail (shown), by soldering (not shown) and/or by an adhesive (not shown). The electrical end connector 150 also includes a resilient member 154. As described herein, the electrical end connector 150 further includes the first end portion 151 on the other end of the protruding portion 154 (not shown).

According to an embodiment of the present invention, not both of the first 151 and second 152 end portions of the at least one electrical end connector 150 are arranged in the first 121 and second 122 longitudinal grooves of the panel, i.e. one or more of the first 151 and second 152 end portions are arranged in recesses separate from the first 121 and second 122 longitudinal grooves.

Figure 5I:
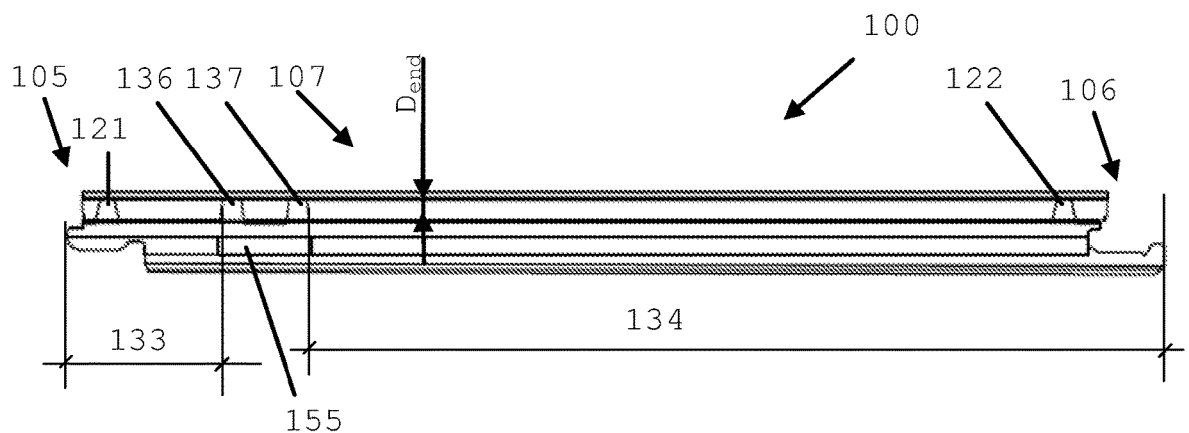
Figure 5J:
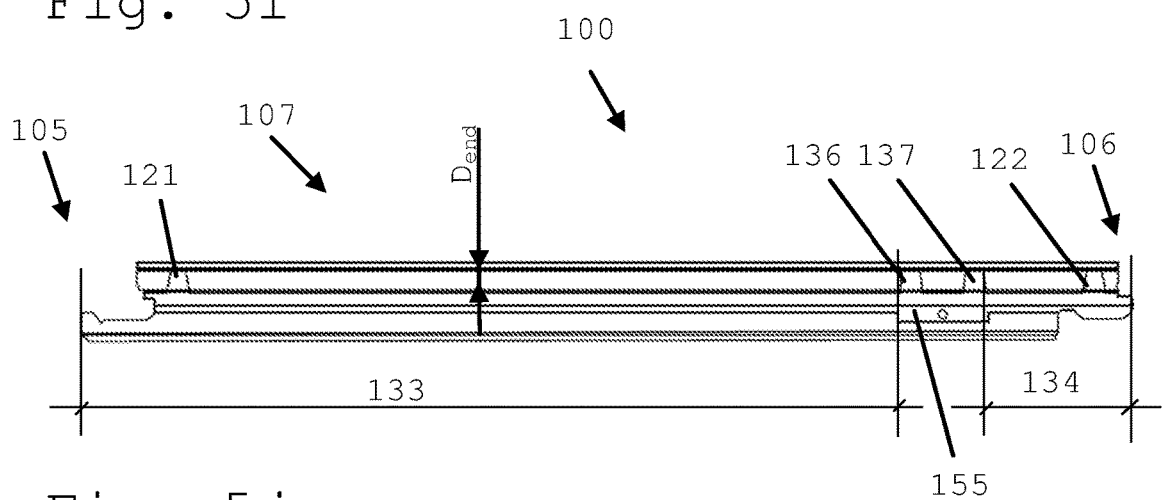

As illustrated in the end side view FIGS. 5*i-j*, the panel 100 then includes first 136 and second 137 panel end recesses adjacent to/facing at least one of the first 107 and the second 108 end sides, respectively, i.e. adjacent to/facing the at least one of the first 117 and second 118 end panel coupling means. The first 136 and second 137 panel end recesses have at least first 133 and second 134 distances to the first 105 and second 106 longitudinal sides, respectively, and being arranged for at least partly receiving the first 151 and second 152 end portions of the at least one electrical end connector 150. At least one of the first 136 and second 137 end recesses are located further from its respective first 105 and second 106 longitudinal sides than the corresponding herein described first 121 and second 122 longitudinal groove. Thus, at least one of the first 133 and second 134 longitudinal side distances for the first 136 and second 137 panel end recesses is longer than the corresponding first 131 and second 132 longitudinal side distances for the first 121 and second 122 grooves, respectively; 133>131 and/or 134>132.

The first 136 and second 137 panel end recesses are similar to the above described first 126 and second 127 groove end sections, although being arranged at other first 133 and second 134 longitudinal side distances than the above mentioned first 131 and second 132 longitudinal side distances of the first 126 and second 127 groove end sections, respectively.

Thus, according to an embodiment, the first 136 and second 137 panel end recesses have a depth $D_{end}$ essentially corresponding to a thickness $T_{end\_con}$ for the first 151 and second 152 end portions of the at least one electrical end connector 150; $D_{end}=T_{end\_con}$ the first 136 and second 137 panel end recesses may have a depth $D_{end}$ being greater than a depth $D_{mid}$ along a rest of the at least first 121 and second 122 longitudinal grooves; $D_{end}>D_{mid}$. When the end depth $D_{end}$ corresponds to the thickness $T_{end\_con}$ of the first 151 and second 152 end portions of the at least one electrical end connector, there are no air gaps at the first 107 and second 108 end sides of the panel. Hereby, a very robust panel is provided, for which wear of the joints is mitigated.

The first 136 and second 137 panel end recesses may further, according to an embodiment, have a length $L_{end\_recess}$ such that the first 151 and second 152 end portions of the at least one electrical end connector 150 protrudes from the one or more of the first 117 and second 118 end panel coupling means when being received in the first 136 and second 137 panel end recesses, respectively.

The first 136 and second 137 panel end recesses may, according to an embodiment, further include a supporting notch/rim/aperture 155 arranged for receiving a supporting member 156 of the electrical end connector 150, as described more in detail below.

The first 151 and second 152 end portions of the at least one electrical end connector 150 are then received, respectively, in corresponding first and second panel end recesses of an adjacent panel 201, 202 being mechanically coupled to the panel 100, whereby the first 151 and second 152 end portions may be symmetrically or asymmetrically arranged in the joints between two adjacent panels 100, 202, as described above.

Figure 5K:
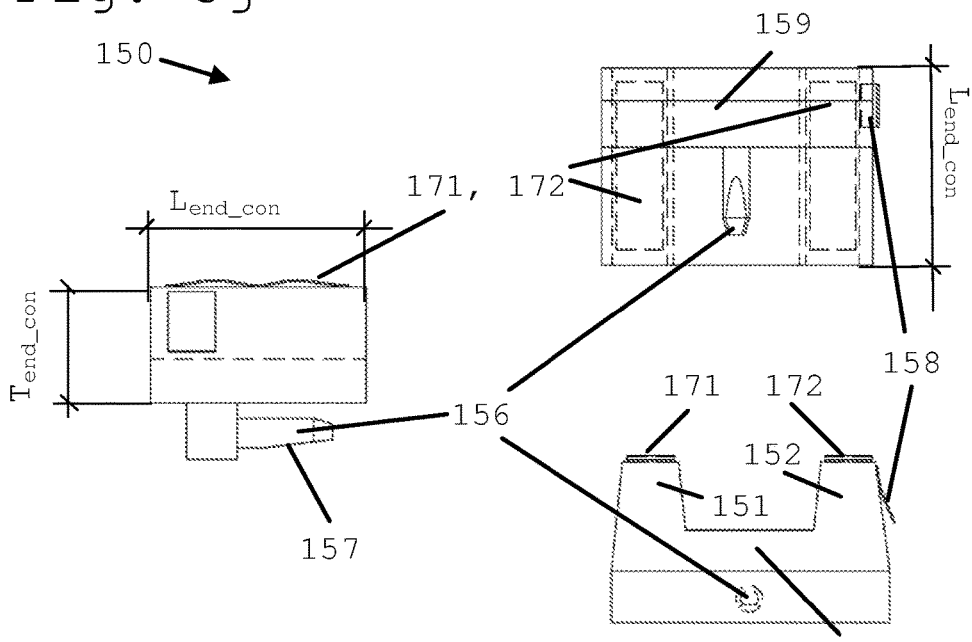

As shown in FIG. 5*k*, for the embodiments in which the panel 100 includes the first 136 and second 137 panel end recesses, the at least one electrical end connector 150 may include a supporting member 156 attached to the first 151 and second 152 end portions, i.e. arranged on a bridging member 159 arranged/attached between first 151 and second 152 end portions. The supporting member 156, illustrated in different views in FIG. 5*k*, protrudes from the one or more of the first 117 and second 118 end panel coupling means when it is received/arranged in the first 136 and second 137 panel end recesses. The supporting member 156 is arranged for being inserted into the supporting notch/rim/aperture 155 of an adjacent panel 202 being coupled to the panel 100, thereby creating a force F acting against a torque Tq provided to the panel 100 when the panel 100 is pressed down for being mechanical coupled to the adjacent panel 202 by the end panel coupling means. Thus, the supporting member 156 of the panel 100 is arranged for, in cooperation with the supporting notch/rim/aperture 155 of an adjacent panel 202, creating the stabilizing force F in response to the pressing torque Tq, which facilitates a safe mechanical coupling of the panel 100 and the adjacent panel 202.

The supporting member 156 is, according to an embodiment, at least partly tapered, i.e. has an at least partly tapered portion/section 157, which facilitates easier insertion of the supporting member 156 into the supporting notch/rim/aperture 155. The supporting member 156 may have essentially any form suitable for creating the stabilizing anti-torque force F, and may e.g. have the form of at least one plug and/or pin, as illustrated in FIG. 5*k*, whereby the supporting notch/rim/aperture 155 includes at least one corresponding hole, as illustrated in FIG. 5*j*, against which the force F may act. The supporting member 156 may also have the form of a lip, which may more or less be extended along the end side of the panel 100, whereby the supporting notch/rim/aperture 155 includes a corresponding edge, against which the stabilizing force F may act.

As described above and below, the first 151 and second 152 end portions of the at least one electrical end connector 150 are at least partly electrically conductive, which facilitates an electrical connection between the panel 100 and the adjacent panel 202, i.e. between the heat providing layers of the panel 100 and the adjacent panel 202. The first 151 and second 152 end portions of the at least one electrical end connector 150 may for this reason include first 171 and second 172 electrically conducting tongues, respectively, as illustrated in FIG. 5*k*. The tongues 171, 172 are arranged for being in electrical contact with the heat providing layers 102 of the panel 100 and of the adjacent panel 202 being coupled together.

The first 151 and second 152 end portions of the at least one electrical end connector 150 may also be made of an electrically conducting material themselves to provide the electrical connection.

The first 151 and second 152 end portions of the electrical end connector 150 are arranged/received/inserted in the first 136 and second 137 end recesses in the panel 100, and in corresponding first and second end recesses of an adjacent panel 200 being coupled mechanically to the panel 100. Hereby, the electrical connection between the panel 100 and the adjacent panel 202, i.e. between the heat providing layers of the panel 100 and the adjacent panel 202 is achieved/ provided, as described herein.

According to an embodiment, an electrical coupling is arranged from the first 151 and second 152 end portions received in the first 136 and second 137 end recesses to the first 141 and second 142 longitudinal coupling elements in the panel 100, as described in detail for the first 141 and second 142 longitudinal coupling elements.

As illustrated in FIG. 5*k*, one or more of the first 151 and second 152 end portions of the at least one electrical end connector 150 may, according to an embodiment, be at least partly resilient, e.g. may have a resilient/flexible member 158 which is arranged for snap locking with at least one of at least one corresponding first 117 and second 118 end panel coupling means of at least one adjacent panel 201, 202. The resilient member 158 is then pressed against the one or more end portion 152 (in the example shown in FIG. 5k) when being inserted into one or more of the first 136 and second 137 end recesses, and then flexes out/away from the one or more end portion 152 and extends/snaps into an aperture/notch/rim of the adjacent panel 201, 202, when the panel 100 and the adjacent panel 201, 202 are mechanically coupled together, thereby providing the snap locking function. The panel 100 may here be provided with a through hole from one or more of the first 105 and second 106 longitudinal sides to one or more of the first 136 and second 137 end recesses, such that an instrument, e.g. a screwdriver or the like, may be inserted into the through hole and may be pressed against the resilient member 158 to unlock/release the snap locking.

According to an embodiment, a first longitudinal coupling element 141 is arranged in the first longitudinal groove 121, and a second longitudinal coupling element 142 is arranged in the second longitudinal groove 122. The first 141 and second 142 longitudinal coupling elements then extend in the first 121 and second 122 longitudinal grooves, respectively, from the first end side 107 to the second end side 108, i.e. along essentially the whole length of the panel.

FIGS. 2a-d and 3a-d schematically show cross-sectional views of a part of the panel 100 including the first longitudinal groove 121 formed in the base layer 101 of the panel at the first distance 131 to the first longitudinal side 105. The heat providing layer 102 is attached to the base layer 101, and the covering layer 103 is attached to the heat providing layer 102.

According to an embodiment of the present invention, the first 143 and second 144 surfaces of the first 141 and second 142 longitudinal coupling elements facing the heat providing layer 102 are, when the panel 100 is assembled, aligned with the rest of the surface 145 of the base layer 101. Thus, the surface 145 of the base layer 102 outside of the first 121 and second 122 longitudinal grooves and the first 143 and second 144 surfaces of the first 141 and second 142 longitudinal coupling elements, respectively, are on the same level, such that an essentially flat common surface 143, 144, 145 facing the heat providing layer 102 is created by the base layer 102 and the first 141 and second 142 longitudinal coupling elements. Hereby, a very robust panel is achieved, which copes with essentially all sorts of pressure on the covering layer 103.

According to an embodiment, schematically illustrated in FIGS. 2c-d, the first 141 and second 142 longitudinal coupling elements comprise an at least partly resilient and electrically conducting material, such as e.g. an electrically conducting metal. These first 141 and second 142 longitudinal coupling elements may then by this resilience create a pressing force against the side and/or bottom walls of the first 121 and second 122 longitudinal grooves, which securely fixates the first 141 and second 142 longitudinal coupling elements within the first 121 and second 122 longitudinal grooves. The first 141 and second 142 longitudinal coupling elements may for example be essentially U-shaped, and may be inserted upside-down in the first 121 and second 122 longitudinal grooves while the legs of the U-shaped elements are pressed together, whereby a spring force towards the inside walls of the first 121 and second 122 longitudinal grooves is created.

According to another embodiment of the present invention, schematically illustrated in FIGS. 3a-b, the first 141 and second 142 longitudinal coupling elements comprise a solid and electrically conducting material, such as e.g. an electrically conducting metal.

The first 151 and at second 152 electrical end connectors, e.g. the first 171 and second 172 electrically conducting tongues of the first 151 and at second 152 electrical end connectors, may then for the embodiments shown in FIGS. 2c-d and 3a-b, be electrically connected to the heat providing layer 102 by being arranged in the first 121 and second 122 longitudinal grooves, e.g. in the first 126 and second 127 groove end sections. The electrical connection may be provided via the electrically conducting at least first 141 and second 142 longitudinal coupling elements. The heat providing layer 102 may here be arranged between the covering layer 103 and the first 141 and second 142 longitudinal coupling elements, as shown in FIGS. 2c-d and 3a-b. The heat providing layer 102 may be attached to the first 141 and second 142 longitudinal coupling elements, e.g. by an electrically conducting adhesive and/or an electrically conducting soldering. The first 151 and second 152 electrical end connectors and/or the first 161 and second 162 electrical power supply end connectors may here be arranged between the bottom of the first 121 and second 122 longitudinal grooves and the first 141 and second 142 longitudinal coupling elements. Thus, the first 151 and second 152 electrical end connectors, e.g. the first 171 and second 172 electrically conducting tongues of the first 151 and at second 152 electrical end connectors, may be fixed in the panel 100 by being pressed against the bottom of the first 121 and second 122 longitudinal grooves by the first 141 and second 142 longitudinal coupling elements.

According to an embodiment, schematically illustrated in FIGS. 3c-d, the heat providing layer 102 is arranged on the surface 145 of the base layer 102 outside of the first 121 and second 122 longitudinal grooves and in the first 121 and second 122 longitudinal grooves between the base layer 101 and the first 141 and second 142 longitudinal coupling elements, respectively. The first 141 and second 142 longitudinal coupling elements may here be either electrically non-conducting, e.g. of an electrically isolating material such as wood or a plastic material, or may be electrically conducting, e.g. of a metal. The primary function of the first 141 and second 142 longitudinal coupling elements is here to press the heat providing layer 102 against the first 151 and second 152 electrical end connectors, e.g. against the first 171 and second 172 electrically conducting tongues of the first 151 and at second 152 electrical end connectors, and/or against the below described first 161 and second 162 electrical power supply end connectors being inserted/arranged into the first 121 and second 122 longitudinal grooves, such that an electrical contact/connection between the heat providing layer 102 and the first 151 and second 152 electrical end connectors, e.g. the first 171 and second 172 electrically conducting tongues of the first 151 and at second 152 electrical end connectors, is secured.

Also, the U-shaped and at least partly resilient first 141 and second 142 longitudinal coupling elements illustrated in FIGS. 2c-d may also be arranged such that the heat providing layer 102 is arranged in the first 121 and second 122 longitudinal grooves between the base layer 101 and the first 141 and second 142 longitudinal coupling elements, respectively. Thus, the heat providing layer 102 would then be arranged in the first 121 and second 122 longitudinal grooves with the first 141 and second 142 longitudinal coupling elements inserted in the grooves on top of the heat providing layer 102, and on the surface 145 of the base layer 102 outside of the first 121 and second 122 longitudinal grooves. The legs of the U-shaped elements may then be pressed together at insertion into the grooves, whereby a spring force at least towards the inside walls of the first 121 and second 122 longitudinal grooves is created after insertion. This also results in that the first 141 and second 142 longitudinal coupling elements and the heat providing layer 102 are pressed firmly against each other, resulting in a reliable electrical contact between the two, at the same time as the wear on the heat providing layer 102 is minimized.

The panel 100 may, according to some embodiments of the present invention, include further longitudinal grooves, i.e. may in total include more than two longitudinal grooves. The panel then also includes further corresponding longitudinal coupling elements, and further corresponding electrical end connectors.

FIGS. 4a-b illustrate an embodiment of the present invention, in which the panel 100 includes at least one sandwich/isolating core 160 included in the base layer 101. The at least one sandwich/isolating core 160 may have heat insulating properties, preventing that created heat is transported in the wrong direction, i.e. away from the space to be heated. For example, a temperature increase of e.g. 3° C. for a panel without insulation could result in a temperature increase of e.g. 5-6° C. for the same panel with at least one sandwich/insulating core 160 added to the base layer 101. The at least one sandwich/insulating core 160 may also have sound/noise absorbing properties, which then efficiently reduces the noise of e.g. high heels being walked across the floor.

The sandwich/isolating core 160 may e.g. include polyurethane, for example in form of a polyurethane foam being injected at and/or after assembly of the layers of the panel 100.

FIGS. 4c-e illustrate some embodiments of the present invention, in which the panel 100 includes at least one sandwich/insulating core 160 included in the base layer 101. The at least one sandwich/insulating core 160 may here e.g. include pyramid formed support elements E that may, by the side surfaces A, B of the pyramid forms, provide supportive force/pressure from the pyramid formed support elements E on the corresponding pyramid formed parts D of the base layer 101 of the panel 100, such that they may carry heavier loads. The pyramid formed support elements E may have their base side facing away from the covering layer 104, and the pointed side towards the covering layer 103. As mentioned above, the at least one sandwich/insulating core 160 may have heat and/or sound/noise insulating properties. Thus, the pyramid shaped support elements provide optimal insulation in combination with an optimal carrying capacity for the panel 100.

FIG. 4e illustrate an embodiment, for which load/weight carrying element 170 are arranged between the sandwich/insulating core pyramid forms 160 in the base layer 101 material, which may be e.g. wood or some other material suitable for carrying weight. The load carrying element 170 may for example have a circular form, e.g. may be essentially screw/bolt-formed with a wider circular head part and a thinner circular pointed part, with the wider part directed towards the covering layer 103. The load carrying element 170 may be of essentially any load carrying material, such as e.g. metal or plastic. The circular head part of the load carrying element 170 is arranged for carrying weight/load originating from the covering layer 103, such that the bottom regions of the pyramid formed parts D of the base layer 101 may be less strong, i.e. do not have to be strong enough to itself take up the whole carrying weight/load. Thus, the weight/load originating from the covering layer is here at least partly carried by the load carrying elements 170.

The load carrying elements 170 may be casted/moulded together with base layer 101 material in order to improve the load carrying capabilities of the panel, i.e. to improve the load/weight carrying capabilities of the base layer 101 material. Hereby, a less stable and more porous material may be used for the rest of the base layer 101 material, which lowers the production costs.

According to an aspect of the present invention, an electrical end connector 150 is presented. The electrical end connector 150 and its embodiments are described in this document, and is illustrated e.g. in FIGS. 1 and 5a-k. The electrical end connector 150 is insertable into one or more of the first 117 and second 118 end panel coupling means of the herein described panel 100, according to the herein described embodiments.

The electrical end connector 150 includes the first 151 and second 152 end portions, being at least partly electrically conductive and at least partly protruding from the one or more of the first 117 and second 118 end panel coupling means when being inserted into one or more of the first 117 and second 118 end panel coupling means. The electrical end connector 150 thereby provides an electrical connection between the heat providing layer 102 of the panel 100 and a corresponding heat providing layer of at least one adjacent panel 201, 202 coupled to the panel.

More in detail, when the panel and an adjacent panel are mechanically coupled together, the first and second end portions of the electrical end connector are, according to various embodiments, inserted/received in first and second groove end sections and/or panel end recesses of both the panel and the adjacent panel, whereby the at least partly conducting first and second end portions provides for the electrical connection between the heat providing layers of the panel and of the adjacent panel.

According to an embodiment, the electrical end connector also provides a mechanical coupling to at least one adjacent panel, e.g. by snap locking.

As mentioned above, and also being illustrated e.g. in FIGS. 1 and 5a-k, the first 151 and second 152 end portions of the at least one electrical end connector 150 may, according to an embodiment, include first 171 and second 172 electrically conducting tongues, respectively. The first 171 and second 172 electrically conducting tongues are arranged for being in electrical contact with the heat providing layer 102 of the panel 100 and with a corresponding heat providing layer 102 of an adjacent panel 201, 202, when the panel 100 is coupled to an adjacent panel 201, 202.

For embodiments where at least first 141 and second 142 longitudinal coupling elements are used, as described above, the first 151 and second 152 end portions, e.g. the first 171 and second 172 electrically conducting tongues of the first 151 and second 152 end portions, may be arranged for being in electrical contact with at least first 141 and second 142 longitudinal coupling elements arranged in the at least first 121 and second 122 longitudinal grooves, respectively, of the panel 100. The first 171 and second 172 electrically conducting tongues are then also in electrical contact with a corresponding at least first 141 and second 142 longitudinal coupling elements of an adjacent panel 201, 202 being mechanically coupled to the panel 100.

According to an embodiment, the first 171 and second 172 electrically conducting tongues have a form being suitable for creating a solid contact with the heat providing layers 102 and/or with the at least first 141 and second 142 longitudinal coupling elements. The first 171 and second 172 electrically conducting tongues may for example be at least partly wave-formed, with the peaks of the wave form pointing towards the heat providing layers and/or the least first 141 and second 142 longitudinal coupling elements.

The electric energy being conveyed to the heat providing layer by the first 151 and second 152 electrical end connectors, and possibly the first 141 and second 142 longitudinal electrical coupling elements, may have a voltage in the interval of 5 Volts-60 Volts, or in the interval of 10 Volts-55 Volts, or in the interval of 15 Volts-50 Volts, or in the interval of 25 Volts-50 Volts. The panel according to the present invention may be supplied with such low voltages since the electrical contact between adjacent panels, and possibly also the current/voltage conducting characteristics of the first and second longitudinal electrical coupling elements, and therefore of the panel itself, are very good, i.e. have low losses.

According to an example embodiment of the present invention, the electric energy being supplied to the heat providing layer 102 in order to create the heat has a voltage V of 25 Volts; V=25 volt, which in many regions and/or countries may be handled by a layman, i.e. by a non-electrician.

According to another example embodiment of the present invention, the electric energy has a voltage V of 50 Volts; V=50 volt, which in some regions and/or countries may be handled by a layman.

Figure 7:
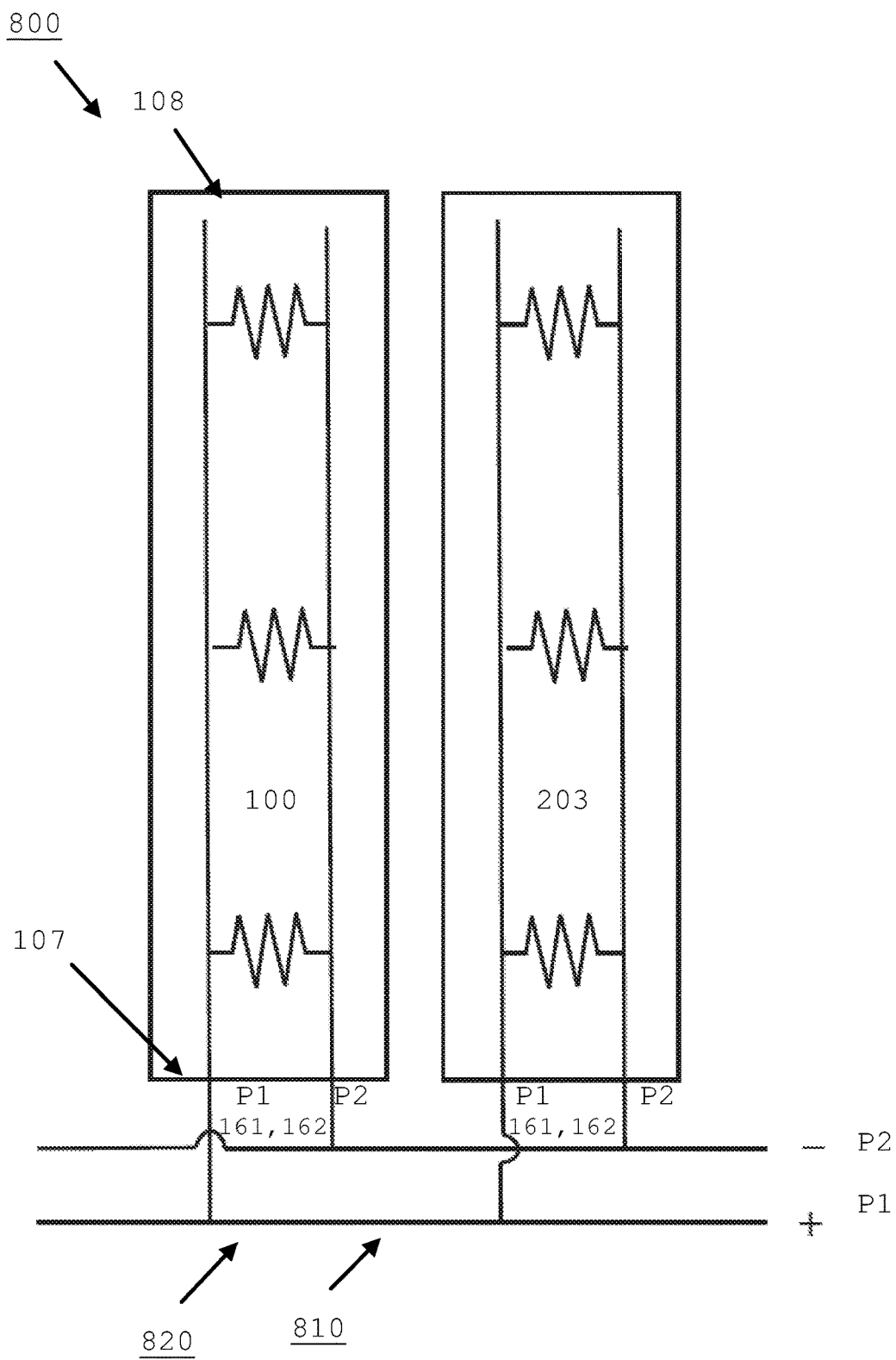

According to an aspect of the present invention, a heating system 800 is presented. The heating system 800, is schematically illustrated in FIG. 7, and includes at least one panel 100, 203 as described above. The heating system further includes an electrical energy providing arrangement 810, arranged e.g. at a mounting base 820 and/or facing the base layer 101 adjacent to at least one of the first 107 and the second 108 end sides of the at least one panel 100, 203. The electrical energy providing arrangement 810 supplies the electric energy to the first 161 and second 162 electrical power supply end connectors of the panel 100. In FIG. 7, only two panels 100, 203 are shown for simplicity. As is clear for a skilled person, many more panels may be included in the heating system 800. Also, each one of the panels 100, 203 in FIG. 7 may represent a row of panels. It should be noted that the electrical energy providing arrangement 810 described in this document may be used for supplying electrical energy to essentially any electrically heated panel, i.e. not only to the herein described panel 100.

According to the embodiment shown in FIG. 7, the electrical energy is provided by first and second polarities P1, P2 being supplied to the first 161 and second 162 electrical power supply end connectors of the first end side 107 of the panel 100, or to a corresponding first end side 107' of an adjacent panel 202 coupled directly or indirectly to the first end side 107 of the panel 100. Thus, both the first and second polarities P1, P2 are connected to a first end side 107 of a first panel 100, 203 in each row of panels being coupled together at their end sides 107, 108. The first and second polarities P1, P2 are then electrically connected to further panels in each row of panels, laid as illustrated in FIG. 6, such that all panels of the whole floor/wall/ceiling are electrified. Hereby, the whole area covered by the panels is heated. Since the voltage used in FIG. 7 is rather low, e.g. 25 Volts, both of the first and second polarities P1, P2 may be supplied to the same end side 107 of the panel. This is possible since the risk for a dangerous electric shock of a person installing the panels is essentially non-existing at these low voltages.

Figure 8:
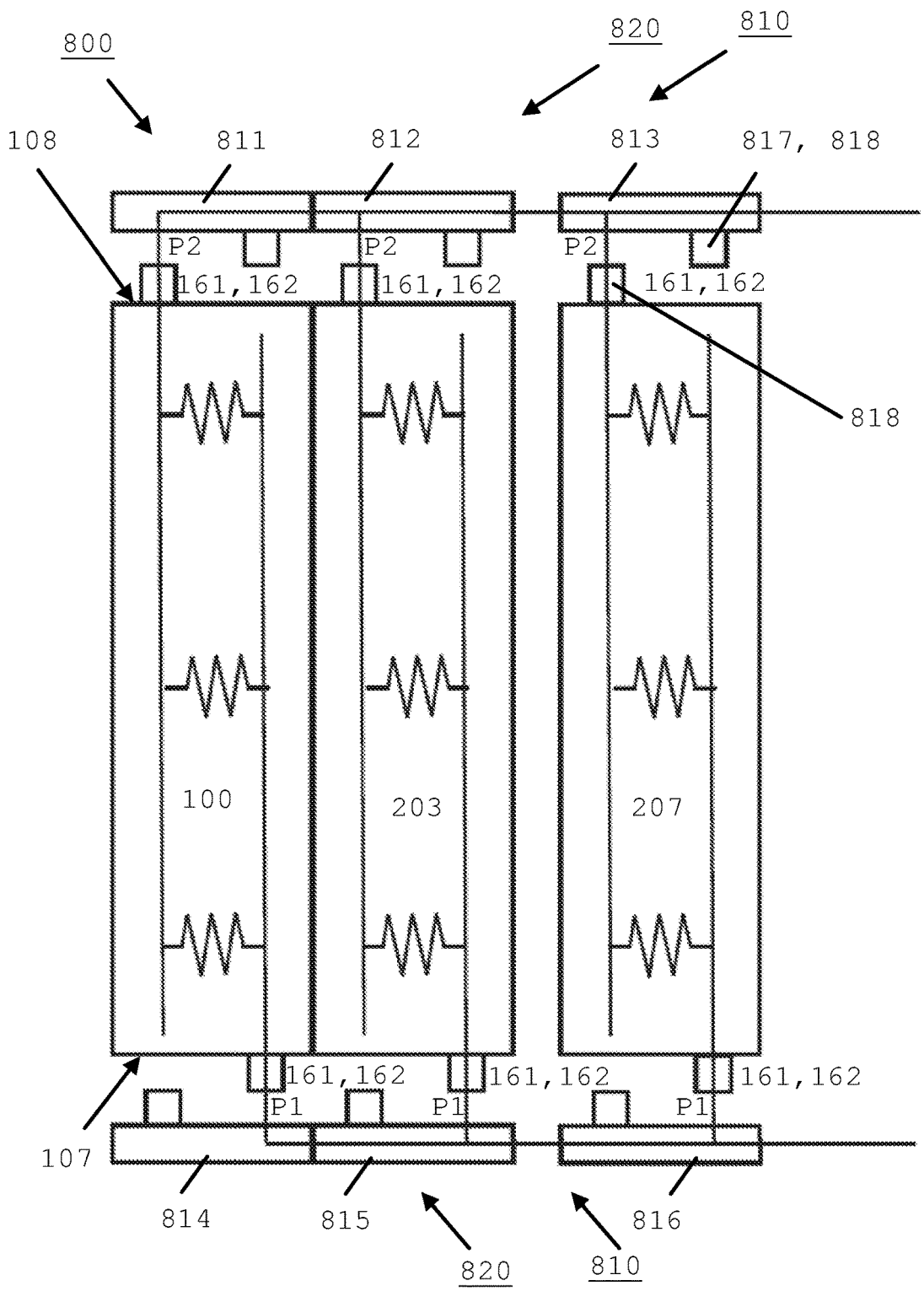

According to another embodiment of the present invention, the electric energy has a voltage of 50 Volts; V=50 Volts; which in some regions and/or countries may be handled by a layman, i.e. by a non-electrician. A heating system 800 is schematically illustrated in FIG. 8, which includes at least one panel 100, 203, 207 as described above. The heating system further includes an electrical energy providing arrangement 810, arranged e.g. at a mounting base 820 and/or facing the base layer 101, on two opposite sides of a floor, wall or ceiling, and adjacent to at both the first 107 and the second 108 end sides of the at least one panel 100, 203, 207. It should be noted that the electrical energy providing arrangement 810 described in this document may be used for supplying electrical energy to essentially any electrically heated panel, i.e. not only to the herein described panel 100.

The electrical energy providing arrangement 810 may include contact means 811, 812, 813, 814, 815, 816, each one being arranged for providing one polarity P1, P2 to the panel 100, 203, 207 by use of a contact protrusion 817 and/or first 161 and second 162 electrical power supply end connectors. The contact means 811, 812, 813, 814, 815, 816 and/or the panels 100, 203, 207 may also include a stability protrusion 818.

When the contact means 811, 812, 813, 814, 815, 816 are assembled with, i.e. are inserted into, the panels 100, 203, 207, the electrical energy is provided to the panels 100, 203, 207 by the contact protrusions 818, and the panels 100, 203, 207 are held in place by the stability protrusions 817. Also, the electrical energy, i.e. the voltage creating the heat in the panels 100, 203, 207, is encapsulated within the panels 100, 203, 207 by the contact means 811, 812, 813, 814, 815, 816. The risk for getting an electric shock is therefore minimized for the heating system 800 illustrated in FIG. 8, partly due to the encapsulated electrical energy, and partly because the two polarities P1, P2 are provided to opposite sides of a floor, wall or ceiling being covered by the panels, and are therefore difficult, often impossible, for a person to come in physical contact with both of P1 and P2 at the same time.

Also, the voltage drop over the heat providing layer is approximately reduced by 50% when the two polarities P1, P2 are provided to opposite sides of a floor.

According to an embodiment of the present invention, schematically illustrated in FIG. 8, the electrical energy is thus provided to the panel 100 by the first polarity P1 being supplied to the first 161 or second 162 electrical power supply end connectors of the first end side 107 of a panel 100. The second polarity P2 is then supplied to the first 151 or second 152 electrical end connectors of the second end side 108 of the panel. Thus, the first polarity P1 is supplied to one end side 107 of the panel 100, and the second polarity P2 is supplied to the opposite end side 108 of the panel 100.

Also, the second polarity P2 may be supplied to the first 161 or second 162 electrical power supply end connectors of a corresponding first end side 107' of an adjacent panel 202 coupled directly or indirectly to the first end side 107 of the panel 100, as illustrated in FIG. 6. Also, the second polarity P2 may be supplied to the first 161 or second 162 electrical power supply end connectors of a corresponding second end side 108' of an adjacent panel 201 coupled directly or indirectly to the second end side 108 of the panel 100.

The electrical energy providing arrangement 810 thus supplies the electric energy to the first 161 and second 162 electrical power supply end connectors on two opposite end sides of the at least one panel 100, 203, 207. In FIG. 8, only three panels 100, 203, 207 are shown for simplicity. As is clear for a skilled person, however, many more panels may be included in the heating system 800. Also, each one of the panels 100, 203, 207 in FIG. 8 may represent a row of panels.

Figure 9:
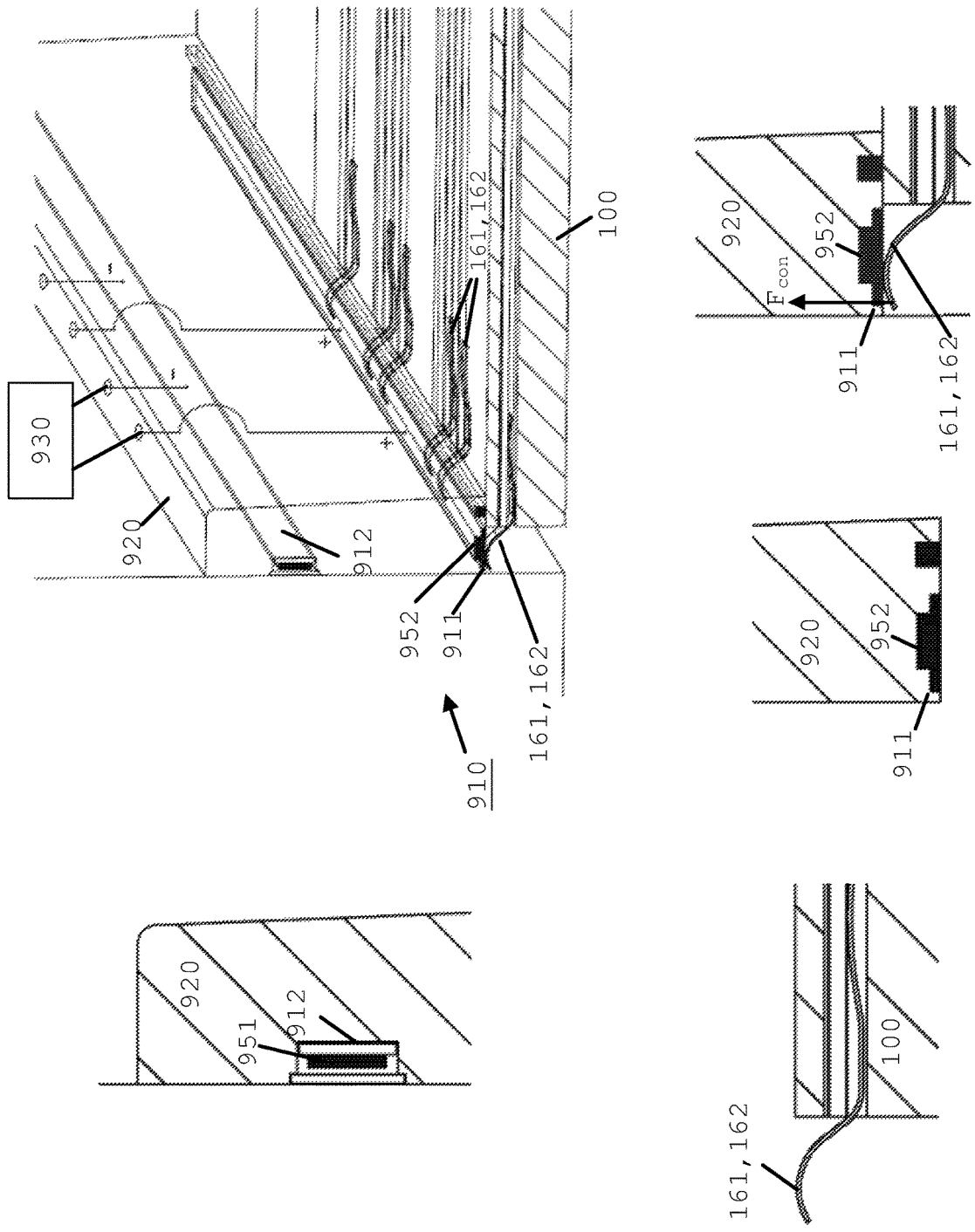

FIG. 9 schematically illustrates a complete heating system is illustrated.

As illustrated in FIG. 9, and mentioned above, first 161 and second 162 electrical power supply end connectors, may be used on one end side 108 of the panel, if this end side is the end side starting a row of panels, i.e. is the end side facing a wall, socket or the like from which the electrical power is provided to the row of panels. These first 161 and second 162 electrical power supply end connectors may be essentially any kind of connector/terminal creating a solid electrical connection, such as e.g. a connector being at least partly resilient and slightly tilted vertically, for example in an upward direction, as illustrated in FIG. 9, providing a connection force between the first 161 and second 162 electrical power supply end connectors and a contact means 911 of an electrical energy providing arrangement 910 including e.g. a mounting base 920 arranged for example along at least one wall on at least one side of a floor, wall or ceiling, and adjacent to the end side of the at least one panel 100.

The at least one first contact means 911 may here e.g. be arranged as an electrically conducting contact strip, possibly in metal, being arranged horizontally in the electrical energy providing arrangement 910, such that it provides for a contact surface for the slightly upwardly tilted first 161 and second 162 electrical power supply end connectors. Thus, a vertical contact force $F_{con}$ is created when the at least one panel 100 and the electrical energy providing arrangement 910, e.g. in the form of a mounting base, are mounted together.

Also, the electrical energy providing arrangement 910, e.g. included in the mounting base 920 described in this document may, as mentioned above, be used for supplying electrical energy to essentially any electrically heated panel, i.e. not only to the herein described panel 100, and/or to any other electrical energy consuming device 930, such as e.g. a wall or ceiling heating panel, a lamp or the like. The electrical energy providing arrangement 910 may for this reason include at least one second contact means 912.

According to an embodiment, the at least one first contact means 911 may be provided with first polarity P1, and the at least one second contact means 912 may be provided with another second polarity P2.

Hereby, electrical energy may by the electrical energy providing arrangement 910 supply electrical energy to essentially any electrical device 930 driven by the voltage provided by the electrical energy providing arrangement 910. For example, many kinds of lamps are driven by lower voltages, such as e.g. 25 Volt or 50 Volt, and may therefore be directly supplied with this voltage from the electrical energy providing arrangement 910.

Also, the at least one first 911 and the at least one second 912 contact means of adjacent parts of the energy providing arrangement 910, e.g. in the form of adjacent mounting base parts mounted together, may be electrically coupled by means of coupling means 951, 952, e.g. in form of sheet metal, that may possibly correspond in form and/or function to the herein described first 151 and second 152 electrical end connectors.

Figure 10:
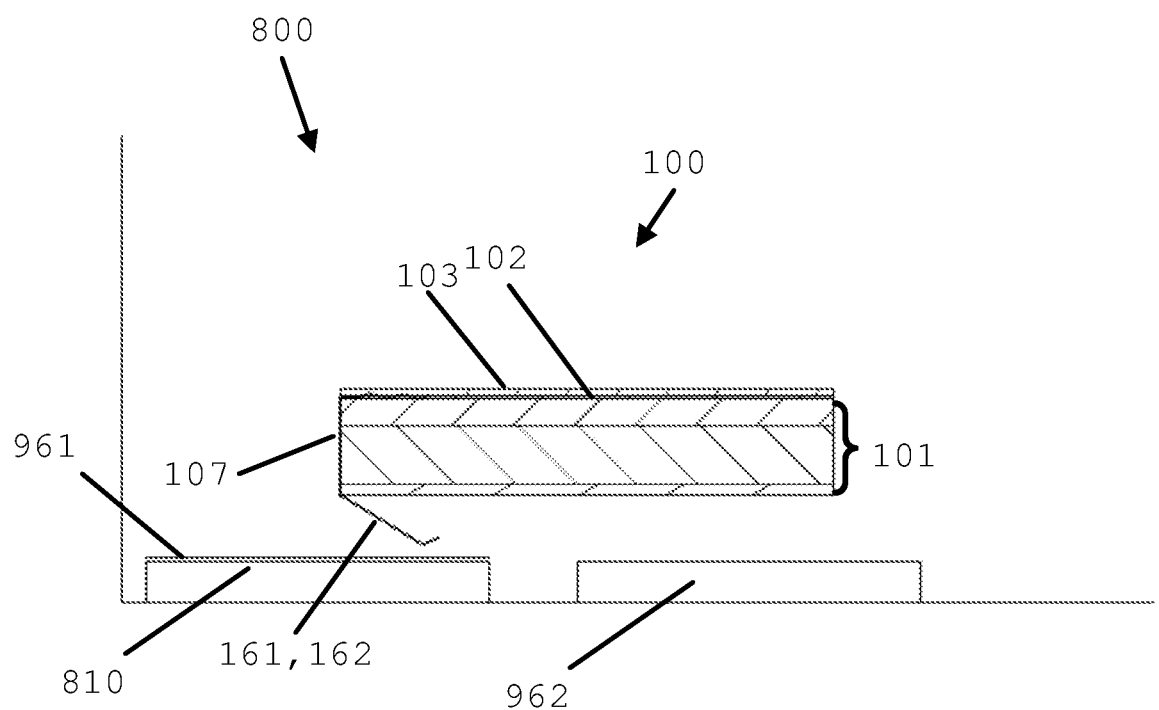

In FIG. 10, a heating system according to an embodiment is illustrated. The electrical energy providing arrangement 810 is here located underneath the panel 100, i.e. facing the base layer 101 of the panel. The at least one first 161 and at least one second 162 electrical power supply end connectors are then bent around at least one of the first 107, 107' and the second 108, 108' end sides of the panel, and are arranged between the base layer 101 of the panel 100 and the electrical energy providing arrangement 810. Hereby, the at least one first 161 and at least one second 162 electrical power supply end connectors are pressed against, and are thus in electrical contact with, at least one part of the electrical energy providing arrangement 810. The electrical energy providing arrangement 810 may, according to an embodiment, include at least one adhesive tape comprising an electrically conducting element 961 facing the base layer 101 of the panel 100. The adhesive tape may for example be pasted/arranged on a floor adjacent to a wall, and thus also adjacent to a panel end side 107, in order to create contact with the at least one first 161 and at least one second 162 electrical power supply end connectors. On the rest of the floor, i.e. underneath the rest of the panels, a stepping layer 962, being e.g. a thin foam and/or paper layer, may cover the floor.

According to an embodiment of the present invention, a method for installing the heating system 800 is presented When panels according to the present invention are to be assembled/laid to become e.g. a floor, the electrical energy providing arrangement 810, 910 described above may first be arranged/mounted at a mounting base 820, 920 and/or facing the base layer 101 on one or two sides of the room to be floored. For example, a lower voltage energy providing arrangement, providing e.g. 25 Volts may be arranged/mounted along one wall of a room and then provides both polarities P1, P2 of the voltage. A higher voltage energy providing arrangement, providing e.g. 50 Volts, may instead be arranged along two opposite sides of a room and the provides one polarity of the voltage from each opposite side of the room. Thus, the electrical energy is then available at one or two sides of the room.

A first panel 100 is then mechanically coupled to at least one second panel 201, 202 by use of the mechanical coupling means 117, 118 on the first 107 and second 108 end sides. Hereby, a row of two or more panels 100, 201, 202 is created. The last second panel 202 in such a row of panels may have to be cut such that the length of the row corresponds to the length of the room.

At the same time as the panels of the row are mechanically coupled, an electrical connection of the first panel 100 and the at least one second panel 201, 202 is achieved by the at least one end connector 150 of the first panel 100. Thus, as the panels 100, 201, 202 are pressed together by the mechanical coupling means 117, 118, also the at least one end connector 150, i.e. the first 151 and second 152 of the end portions of at least one end connector 150, of the panels 100, 201, 202 of the row are pressed into the first 126, 128 and second 127, 129 groove end sections and/or into the first 136 and second 137 panel end recesses of the panels 100, 201, 202, thereby causing an electrical connection of the heat providing layers 102 of the panels 100, 201, 202, e.g. by use of the first 141 and second 142 longitudinal electrical coupling elements of the panels 100, 201, 202 in the row.

Then, the row of the first panel 100 and the at least one second panel 201, 202 is supplied with electrical energy from the electrical energy providing arrangement 810, 910. According to an embodiment described above, which is useful e.g. for lower voltages, this is done by connecting both of the first 161 and second 162 electrical power supply end connectors of the first panel 100 to the electrical energy providing arrangement 810, 910, which then supplies both of the voltage polarities P1, P2 to the first end side 107 of the first panel 100.

According to another embodiment described above, which is useful e.g. for higher voltages, the row of the first panel 100 and the at least one second panel 201, 202 is supplied with electrical energy from the electrical energy providing arrangement 810, 910 by connecting one of the first 161 and second 162 electrical power supply end connectors on the first end side 107 of the first panel 100 to the electrical energy providing arrangement 810, 910. The electrical energy providing arrangement 810, 910 then provides the first side 107 of the first panel 100 of the row of panels with one polarity P1 of the electrical energy. Then, another one of the first 161 and second 162 electrical power supply end connectors on the second end side 108' of the row, i.e. on the second side 108' of the at least one second panel 201, 202 is connected to the electrical energy providing arrangement 810, 910. The electrical energy providing arrangement 810, 910 then provides the second side 108' of the row with another polarity P2 of the electrical energy.

As mentioned above, to supply the row of panels 100, 201, 202 with one voltage polarity at each end of the row has an advantage in that the risk for a person laying the floor getting an electric shock by the electric energy being provided to the panels is considerably reduced. In order to get an electric shock, i.e. in order to come in contact with both polarities of the voltage, the person would have to reach across the entire room, along the whole length of the row of panels, which is not very likely. Thus, a higher voltage supply may be used with this embodiment of the invention.

In the following, some non-limiting examples descriptions of electrical properties and heating properties of a floor according to some of the herein described embodiments are presented.

A power consumption for the floor, P, is given as:

$$P = U*I; \quad \text{(eq. 1)}$$

where U is the voltage applied on the heat providing layer, and I is the corresponding applied electrical current. The applied voltage U is given by the voltage $U_{supply}$ provided by the power source minus a voltage drop $\Delta U$ between the power source and the heat providing layer, i.e.:

$$U = U_{supply} - \Delta U. \quad \text{(eq. 2)}$$

The current I flowing through the heat providing layer is given by ohm's law:

$$U = R*I; \text{ i. e.} \quad \text{(eq. 3)}$$

$$I = U/R; \quad \text{(eq. 4)}$$

where R is the resistance of the heat providing layer. The heat providing layer may be divided in heating modules/sections, where a multiple of modules/sections may be coupled in parallel. For one heat module/section the resistance is given by:

$$R = \text{resistivity} * L_{c\_heat}/A_{c\_heat}; \quad \text{(eq. 5)}$$

where the resistivity is a material parameter, e.g. for pure aluminum approximately $2.82 \times 10^{-8}$ ohm m, $L_{c\_heat}$ is the length of the heating conductor (resistor), and $A_{c\_heat}$ is the cross section area of the heating conductor. The cross section area of the conductor $A_{c\_heat}$ is e.g. for a thin film given as:

$$A_{c\_heat} = h_{c\_heat} * w_{c\_heat}; \quad \text{(eq. 6)}$$

where $h_{c\_heat}$ is the height/thickness of the conductor (resistor), and w is the width of the conductor (resistor).

For example, for a heating module with a heating conductor length $L_{c\_heat}$ of 62.5 m, a width of the heating conductor $w_{c\_heat}$ of 0.642 mm, and a heating conductor film thickness of 9 micrometer, the resistance R is approximately 305 ohm for aluminum.

By combining equations 1 and 4 above, the power is given by:

$$P = U^2/R; \quad \text{(eq. 7)}$$

i.e. the power increases with the square of the voltage, U, and is decreased with the inverse of the resistance R.

The power P may be written as:

$$P = (U^2 * w_{c\_heat} * h_{c\_heat})/(L_{c\_heat} \times \text{resistivity}). \quad \text{(eq. 8)}$$

Because the resistivity is a material parameter, and the conducting heat film thickness is a physical parameter to be chosen, the power may be written as:

$$P = U^2 * (w_{c\_heat}/L_{c\_heat}) * \text{constant}). \quad \text{(eq. 9)}$$

This means that for a chosen type of heat film, the wanted power P is most easily controlled by the voltage, and then by the length $L_{c\_heat}$ and width $w_{c\_heat}$ of the heating conductor (resistor).

Since all electrical power P is converted to Joule heat Q, $P_{heat} = dQ/dt$, $P_{heat}$ is equal to P. The time derivative of Joule heat Q, dQ/dt, which corresponds to a flow of thermal energy. The heat flow, dQ/dt, will flow in the negative direction of the temperature gradient.

The power supplied P will be transformed into heat flow, dQ/dt, which will flow downwards $dQ/dt_{down}$ to the under lay structure by conduction $dQ/dt_{cond}$, and upwards, $dQ/dt_{up}$, by convection $dQ/dt_{conv}$ and radiation, $dQ/dt_{rad}$, and for non-equilibrium to the rise of the temperature of the board/panel, $dQ/dt_{board}$.

$$dQ/dt = dQ/dt_{cond} + dQ/dt_{conv} + dQ/dt_{rad} + dQ/dt_{board} \quad \text{(eq. 10)}$$

For equilibrium:

$$dQ/dt = dQ/dt_{cond} + dQ/dt_{conv} + dQ/dt_{rad} \quad \text{(eq. 11)}$$

$$dQ/dt_{down} = dQ/dt_{cond} \quad \text{(eq. 12)}$$

$$dQ/dt_{up} = dQ/dt_{conv} + dQ/dt_{rad} \quad \text{(eq. 13)}$$

For non-equilibrium the temperature of the board will be raised by $dQ/dt_{board}$.

Regarding the temporal behavior, the temperature derivative with regard to time of the board/panel is:

$$dT/dt = dQ/dt_{board}/(d * \text{density} * C_p); \quad \text{(eq. 14)}$$

where dT/dt is hence proportional to $dQ/dt_{board}$, and obviously, the temperature will rise if $dQ/dt_{board}$ is not zero.

If the board is well insulated from the underlay structure, $dQ/dt_{cond}$ will be small, and hence the temperature gradient in the board/panel will be small, therefore the temperature will approximately follow a first order differential equation. The time dependence of the board/panel will then be:

$$T_{board} = T_{initial} + (T_{end} - T_{initial}) * (1 - e^{-t/tau}); \quad \text{(eq. 15)}$$

where $T_{initial}$ is the temperature of the board/panel before the voltage V is applied, $T_{end}$ is the final temperature, and tau is the characteristic time constant.

$$T_{end} = P * R_{th\_tot}; \quad \text{(eq. 16)}$$

and for tau per area unit:

$$\text{tau} = c_P * \text{density} * d; \quad \text{(eq. 17)}$$

where $c_P$ is the specific heat capacity, $R_{th\_tot}$ is the total thermal resistance, density is the density of the board/panel, and d is the thickness of the board.

Regarding the heat flow dQ/dt and temperature rise of the board/panel, the temperature rise on the surface of the board/panel will be dependent on the power P, the ambient temperature $T_{amb}$, the thermal resistance downwards, $R_{th\_down}$ (between the heat film and the ambient floor), the thermal resistance between the film and the ambient air $R_{th\_up}$. Each layer of the board/panel has its own thermal resistance, i.e. for the board/panel substructure $R_{th\_sub}$, any dampening layer under the board $R_{th\_damp}$, the heating film substrate $R_{th\_substrate}$, the covering layer, $R_{th\_top}$, and for the interface between the covering layer and the ambient air, $R_{th\_conv}$. The thermal resistances downwards add in series, and the thermal resistances upwards add also in a series. However, the total thermal resistance downwards and the total thermal resistance upwards is combined in a parallel manner to a total thermal resistance, $R_{th\_tot}$:

$$R_{th\_down} = R_{th\_sub} + R_{th\_damp}; \quad \text{(eq. 18)}$$

$$R_{th\_up} = R_{th\_substrate} + R_{th\_top} + R_{th\_conv} + R_{rad} \quad \text{(eq. 19)}$$

and $$1/R_{th\_tot} = 1/R_{th\_down} + 1/R_{th\_up} \quad \text{(eq. 20)}$$

Which may be written:

$$R_{th\_tot} = (R_{th\_down} * R_{th\_up})/(R_{th\_down} + R_{th\_up}). \quad \text{(eq. 21)}$$

The temperature increase $\Delta T_{film}$ in the heating film conductor (resistance) is given by:

$$\Delta T_{film} = P * T_{th\_tot}. \quad \text{(eq. 22)}$$

The thermal resistance for a solid material $R_{th\_cond}$ due to thermal conduction is given as:

$$R_{th\_cond} = L_{material}/(\text{Lambda}*A). \quad \text{(eq. 23)}$$

The thermal resistance convection is given as:

$$R_{th\_conv} = A/U_{th\_conv} \quad \text{(eq. 24)}$$

Some non-limiting examples of materials and thermal resistances are given in Table 1 below.

TABLE 1

| Layer | Material | Lambda [W/mK] | $L_{material}$ [mm] | $R_{th}/A$ [mK/Wm²] |
|---|---|---|---|---|
| Dampening | PE | 0.33 | 2 | 57.14 |
| Board/Panel | MDF | 0.14 | 12 | 85.71 |
| Heat film | PET | 0.3 | 0.035 | 0.12 |
| Cover | Laminate | 0.3 | 0.3 | 1.00 |

In the non-limiting example above, an equal heat flow, dQ/dt, in both directions, upwards and downwards, is provided, assuming that the underlay structure has the same temperature as the ambient floor.

The heat flow due to radiation $dQ/dt_{heat}$ is given by:

$$dQ/dt_{heat} = \text{epsilon}*SB*(T_{surface}^4 - T_{ambient}^4); \quad \text{(eq. 25)}$$

where epsilon is the emissivity factor and SB the Stefan-Boltzmann's constant.

For a surface in a cavity, the radiation has to consider the view factor F, so the heat flow due to radiation becomes:

$$dQ/dt_{heat} = \text{epsilon}*SB*(T_{surface}^4 - T_{ambient}^4)*F(\text{physical dimensions}); \quad \text{(eq. 26)}$$

where F ranges, i.e. is in the interval, from 0 to 1.

The surface temperature of the panel is thus dependent on heat leakage to the underlay structure. For a well insulated floor panel, e.g. for 18 mm expanded polystyrene (PS), the temperature rise will be approximately 6 degrees for a power supply of 50 W/m², and 3 degrees for 25 W/m². If the insulation is poor, however, such as e.g. 1 mm PS, the temperature increase will be less, for example 3 degrees at 50 W/m², according to experiments.

The electrical power P has to be supplied to the heating area, i.e. to the heat providing layer. Assuming two parallel power rails, i.e. the first and second parallel longitudinal coupling elements, the current to the heating area can be tapped at different places.

A longitudinal coupling element (a power supply rail) has a resistance according to:

$$R_{rail} = \text{resistivity}_{rail}*L_{rail}*w_{rail}*h_{rail}; \quad \text{(eq. 27)}$$

which e.g. for an aluminum rail with a width, $w_{rail}$, of 1 cm, and a height of 9 micrometer, and a length of 45 cm will have a resistance of 0.14 ohm.

For a panel which is connected to the power supply at one end, i.e. both polarities P1 and P2 are connected to one end side of the panel, the effective resistance will be $2*R_{rail}$, except for the modules/sections in the far ends. However, if the power supply connections are placed on opposite sides of the panel, the effective resistance will be $R_{rail}$.

Between adjacent panels coupled together, there are electrical connections having contact resistances $R_{contact}$. As a non-limiting example, a typical contact resistance may be 0.005 ohm.

Rail resistances and contact resistances will add in series giving a power resistance:

$$R_{power} = R_{rail} + R_{contact} \quad \text{(eq. 28)}$$

It will be a voltage drop along a board due to the rail resistance $R_{rail}$, and it will be a voltage drop between boards/panels along the floor due to contact resistance $R_{contact}$. The voltage drops are proportional to the current I. Using multiple boards/panels in a row means that the voltage drop will increase as the square of the length of the row, because the current will increase proportional with the length, and the power resistance $R_{power}$ will increase proportionally with the length of the floor/row too. Hence, the heat flow $dQ/dt_{heat}$ will decrease with the power of 4. Hence the power resistances are of importance for large floors.

The power resistance $R_{power}$ is twice the size if the power supply is connected on one side of the floor/panel/row, compared if the power supply is connected on the opposite sides of the floor/panel/row. This is thus an advantage for the above described embodiment in which the first P1 and second P2 polarities are supplied to opposite ends of the panel.

As a non-limiting one panel/board example, for a 9 micrometer and 0.64 mm wide aluminum heating film, 62.5 m long acting as a heat conductor (resistance), the resistance is approximately 305 ohm. If the electrical supply is performed by the same film, but with 10 mm wide power rails/coupling elements, the power rails/coupling elements will have a resistance of approximately 0.14 ohm. With a contact resistance of 0.005 ohm, the power rail/coupling elements resistance is dominating. For a board/panel with three heating modules/sections, the heating resistances are in parallel, and the power resistances are in series. The board/panel will then have a heating resistance of 102 ohm, and a total power resistance of 0.8 ohm for same end side power supply connection. Correspondingly, the panel/board will have a 0.4 ohm total power resistance for an opposite end side connection, leading to a power drop of approximately 1% for both cases. This indicates the power supply is adequate within a board/panel, with only the film.

The present invention is not limited to the above described embodiments. Instead, the present invention relates to, and encompasses all different embodiments being included within the scope of the independent claims.

The invention claimed is:

1. A panel, comprising:
a base layer;
a heat providing layer attached to said base layer for providing heat created by electric energy;
a covering layer attached to said heat providing layer;
first and second opposite longitudinal sides including first and second longitudinal panel coupling means, respectively, arranged for coupling said panel to adjacent panels;
first and second opposite end sides including first and second end panel coupling means, respectively, arranged for coupling said panel to adjacent panels;
at least first and second longitudinal grooves arranged in said base layer from said first end side to said second end side and facing said heat providing layer, said at least first and second longitudinal grooves being arranged in parallel with, and having at least first and second distances to said first and second longitudinal sides, respectively, and including first and second groove end sections adjacent to at least one of said first and said second end sides, respectively; and
at least one electrical end connector arranged at one or more of said first and second end panel coupling means, said at least one electrical end connector including first and second end portions, said first and second end portions of the connector being received in said first and second groove end sections of said panel, said first and second end portions also being received, respectively, in corresponding first and second groove end sections of said adjacent panel coupled to said panel, said first and second end portions being at least partly electrically conductive and at least partly protruding from said one or more of said first and second end panel coupling means, thereby providing an electrical connection between said heat providing layer of said panel and a corresponding heat providing layer of said adjacent panel coupled to said panel.

2. Panel according to claim 1, further comprising:
at least first and second longitudinal coupling elements arranged in said at least first and second longitudinal grooves from said first end side to said second end side, respectively; whereby
said first and second end portions of the at least one electrical end connector are arranged for being electrically connected to said heat providing layer by means of said at least first and second longitudinal coupling elements.

3. Panel according to claim 2, wherein said at least first and second longitudinal coupling elements include at least one in the group of:
an at least partly resilient and electrically conducting material; and
a solid and electrically conducting material.

4. Panel according to claim 3, wherein said first and second end portions of said at least one electrical end connector are electrically connected to said heat providing layer via said first and second longitudinal coupling elements.

5. Panel according to claim 1, wherein said first and second end portions of said at least one electrical end connector include first and second electrically conducting tongues, respectively, arranged for being in electrical contact with said heat providing layer of said panel and with a corresponding heat providing layer of an adjacent panel being coupled to said panel.

6. Heating system comprising:
at least one panel according to claim 1; and
an electrical energy providing arrangement, arranged adjacent to at least one of said first and said second end sides of said at least one panel for providing said electric energy to at least one first and at least one second electrical power supply end connectors of said at least one panel.

7. Method for installing said heating system claimed in claim 6, comprising:
mounting said electrical energy providing arrangement;
mechanically coupling a first panel with at least one second panel by use of said coupling means on said first and second end sides, thereby creating a row of said first panel and said at least one second panel;
electrically connecting said first panel and said at least one second panel by use of said at least one end connector of said first panel; and
connecting first and second electrical power supply end connectors of one or more of said first panel and said at least one second panel to said electrical energy providing arrangement.

8. A panel, comprising:
a base layer;
a heat providing layer attached to said base layer for providing heat created by electric energy;
a covering layer attached to said heat providing layer;
first and second opposite longitudinal sides including first and second longitudinal panel coupling means, respectively, arranged for coupling said panel to adjacent panels;
first and second opposite end sides including first and second end panel coupling means, respectively, arranged for coupling said panel to adjacent panels;
at least first and second longitudinal grooves arranged in said base layer from said first end side to said second end side and facing said heat providing layer, said at least first and second longitudinal grooves being arranged in parallel with, and having at least first and second distances to said first and second longitudinal sides, respectively; and
at least one electrical end connector arranged at one or more of said first and second end panel coupling means, said at least one electrical end connector including first and second end portions, said first and second end portions being received in said first and second longitudinal grooves, respectively, of said panel, said first and second end portions also being received, respectively, in corresponding first and second longitudinal grooves of said adjacent panel coupled to said panel, said first and second end portions being at least partly electrically conductive and at least partly protruding from said one or more of said first and second end panel coupling means, thereby providing an electrical connection between said heat providing layer of said panel and a corresponding heat providing layer of said adjacent panel coupled to said panel;
wherein said at least one electrical end connector is at least partly resilient and includes an at least partly protruding portion between said first and second end portions, such that said at least partly protruding portion protrudes at least partly from said one or more of said first and second end panel coupling means in a relaxed state, wherein said at least partly protruding portion of said at least one electrical end connector is arranged for being snapped into at least one of first and second end panel coupling means of said adjacent panel, thereby mechanically locking said panel to said adjacent panel.

9. Panel according to claim 8, further comprising:
at least first and second longitudinal coupling elements arranged in said at least first and second longitudinal grooves from said first end side to said second end side, respectively; whereby
said first and second end portions of the at least one electrical end connector are arranged for being electrically connected to said heat providing layer by means of said at least first and second longitudinal coupling elements.

10. Panel according to claim 9, wherein said at least first and second longitudinal coupling elements include at least one in the group of:
an at least partly resilient and electrically conducting material; and
a solid and electrically conducting material.

11. Panel according to claim 10, wherein said first and second end portions of said at least one electrical end connector are electrically connected to said heat providing layer via said first and second longitudinal coupling elements.

12. Heating system comprising:
at least one panel according to claim 8; and
an electrical energy providing arrangement, arranged adjacent to at least one of said first and said second end sides of said at least one panel for providing said electric energy to at least one first and at least one second electrical power supply end connectors of said at least one panel.

13. A panel, comprising:
a base layer;
a heat providing layer attached to said base layer for providing heat created by electric energy;
a covering layer attached to said heat providing layer;
first and second opposite longitudinal sides including first and second longitudinal panel coupling means, respectively, arranged for coupling said panel to adjacent panels;
first and second opposite end sides including first and second end panel coupling means, respectively, arranged for coupling said panel to adjacent panels;
at least first and second panel end recesses adjacent to at least one of said first and second opposite end sides, respectively, said first and second panel end recesses having at least first and second distances to said first and second longitudinal sides, respectively; and
at least one electrical end connector arranged at one or more of said first and second end panel coupling means, said at least one electrical end connector including first and second end portions, said first and second end portions being received in said first and second panel end recesses, respectively, of said panel, said first and second end portions also being received, respectively, in corresponding first and second panel end recesses of said adjacent panel coupled to said panel, said first and second end portions being at least partly electrically conductive and at least partly protruding from said one or more of said first and second end panel coupling means, thereby providing an electrical connection between said heat providing layer of said panel and a corresponding heat providing layer of said adjacent panel coupled to said panel, wherein said at least one electrical end connector includes a supporting member attached to said first and second end portions, said supporting member protruding from said one or more of said first and second end panel coupling means and being arranged for being inserted into a supporting notch of said adjacent panel being coupled to said panel, thereby creating a force F acting against a torque Tq provided to said panel for achieving a mechanical coupling between said panel and said adjacent panel.

14. Panel according to claim 13, further comprising:
at least first and second longitudinal coupling elements arranged in said at least first and second longitudinal grooves from said first end side to said second end side, respectively; whereby
said first and second end portions of the at least one electrical end connector are arranged for being electrically connected to said heat providing layer by means of said at least first and second longitudinal coupling elements.

15. Panel according to claim 14, wherein said at least first and second longitudinal coupling elements include at least one in the group of:
an at least partly resilient and electrically conducting material; and
a solid and electrically conducting material.

16. Panel according to claim 15, wherein said first and second end portions of said at least one electrical end connector are electrically connected to said heat providing layer via said first and second longitudinal coupling elements.

17. Heating system comprising:
at least one panel according to claim 13; and
an electrical energy providing arrangement, arranged adjacent to at least one of said first and said second end sides of said at least one panel for providing said electric energy to at least one first and at least one second electrical power supply end connectors of said at least one panel.

18. An electrical end connector insertable into one or more of said first and second end panel coupling means of a panel, the panel including:
a base layer;
a heat providing layer attached to said base layer for providing heat created by electric energy;
a covering layer attached to said heat providing layer;
first and second opposite longitudinal sides including first and second longitudinal panel coupling means, respectively, arranged for coupling said panel to adjacent panels; and
first and second opposite end sides including said first and second end panel coupling means, respectively, arranged for coupling said panel to said adjacent panels; and
at least first and second longitudinal grooves arranged in said base layer from said first end side to said second end side and facing said heat providing layer, said at least first and second longitudinal grooves being arranged in parallel with, and having at least first and second distances to said first and second longitudinal sides, respectively, and including first and second groove end sections adjacent to at least one of said first and said second end sides, respectively;
said electrical end connector including:
first and second end portions configured to be received, respectively, in said first and second groove end sections of said panel, said first and second end portions also being configured to be received, respectively, in corresponding first and second groove end sections of said adjacent panel, said first and second end portions being at least partly electrically conductive and at least partly protruding from said one or more of said first and second end panel coupling means when being inserted, thereby providing an electrical connection between said heat providing layer of said panel and a corresponding heat providing layer of said adjacent panel.

19. An electrical end connector insertable into one or more of first and second end panel coupling means of a panel, the panel including:

a base layer;

a heat providing layer attached to said base layer for providing heat created by electric energy;

a covering layer attached to said heat providing layer;

first and second opposite longitudinal sides including first and second longitudinal panel coupling means, respectively, arranged for coupling said panel to adjacent panels; and first and second opposite end sides including first and second end panel coupling means, respectively, arranged for coupling said panel to adjacent panels; and at least first and second longitudinal grooves arranged in said base layer from said first end side to said second end side and facing said heat providing layer, said at least first and second longitudinal grooves being arranged in parallel with, and having at least first and second distances to said first and second longitudinal sides, respectively;

said electrical end connector including:

first and second end portions configured to be received, respectively, in said first and second longitudinal grooves of said panel, said first and second end portions also being configured to be received, respectively, in corresponding first and second longitudinal grooves of said adjacent panel, said first and second end portions being at least partly electrically conductive and at least partly protruding from said one or more of said first and second end panel coupling means when being inserted, thereby providing an electrical connection between said heat providing layer of said panel and a corresponding heat providing layer of said adjacent panel coupled to said panel;

wherein said at least one electrical end connector is at least partly resilient and includes an at least partly protruding portion between said first and second end portions, such that said at least partly protruding portion protrudes at least partly from said one or more of said first and second end panel coupling means in a relaxed state, said at least partly protruding portion of said at least one electrical end connector being arranged to be snapped into at least one of first and second end panel coupling means of said adjacent panel, thereby mechanically locking said panel to said one adjacent panel.

20. An electrical end connector insertable into one or more of first and second end panel coupling means of a panel, the panel including:

a base layer;

a heat providing layer attached to said base layer for providing heat created by electric energy;

a covering layer attached to said heat providing layer;

first and second opposite longitudinal sides including first and second longitudinal panel coupling means, respectively, arranged for coupling said panel to adjacent panels; and first and second opposite end sides including first and second end panel coupling means, respectively, arranged for coupling said panel to adjacent panels; and at least first and second panel end recesses adjacent to at least one of said first and second opposite end sides, respectively, said first and second panel end recesses have at least first and second distances to said first and second longitudinal sides, respectively;

said electrical end connector including:

first and second end portions configured to be received, respectively, in said first and second panel end recesses, respectively, of said panel, said first and second end portions also being configured to be received, respectively, in corresponding first and second panel end recesses of said adjacent panel, said first and second end portions being at least partly electrically conductive and at least partly protruding from said one or more of said first and second end panel coupling means when being inserted, thereby providing an electrical connection between said heat providing layer of said panel and a corresponding heat providing layer of said adjacent panel;

wherein said electrical end connector includes a supporting member attached to said first and second end portions, said supporting member being configured to protrude from said one or more of said first and second end panel coupling means when inserted, and being configured to be inserted into a supporting notch of said adjacent panel, thereby creating a force F acting against a torque Tq provided to said panel for achieving a mechanical coupling between said panel and said adjacent panel.

* * * * *